(12) United States Patent
Shin et al.

(10) Patent No.: US 9,860,359 B2
(45) Date of Patent: Jan. 2, 2018

(54) METHOD FOR COMMUNICATING WITH NEIGHBOR DEVICE, ELECTRONIC DEVICE, AND STORAGE MEDIUM

(71) Applicant: Samsung Electronics Co., Ltd., Suwon-si, Gyeonggi-do (KR)

(72) Inventors: Yeung-Seob Shin, Yongin-si (KR); Dong-Sun Lim, Seoul (KR); Sun-Min Hwang, Hwaseong-si (KR); Jung-Woo Lee, Suwon-si (KR); Sang-Min Bae, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/595,604

(22) Filed: Jan. 13, 2015

(65) Prior Publication Data
US 2015/0244853 A1 Aug. 27, 2015

(30) Foreign Application Priority Data
Feb. 22, 2014 (KR) ........................ 10-2014-0020992

(51) Int. Cl.
*H04M 1/725* (2006.01)
*H04W 4/00* (2009.01)
*H04W 4/20* (2009.01)
*H04M 11/00* (2006.01)
*H04W 48/08* (2009.01)
*H04W 68/00* (2009.01)
*H04W 76/02* (2009.01)

(52) U.S. Cl.
CPC ..... *H04M 1/72533* (2013.01); *H04M 11/007* (2013.01); *H04W 4/008* (2013.01); *H04W 4/206* (2013.01); *H04W 48/08* (2013.01); *H04W 68/005* (2013.01); *H04W 76/02* (2013.01)

(58) Field of Classification Search
CPC ........... H04M 1/72533; H04M 11/007; H04W 76/02; H04W 48/08; H04W 68/005; H04W 4/008; H04W 4/206
USPC ........................................................ 455/420
See application file for complete search history.

(56) References Cited

U.S. PATENT DOCUMENTS

2005/0229173 A1  10/2005  Mihm et al.
2006/0221917 A1  10/2006  McRae
(Continued)

FOREIGN PATENT DOCUMENTS

EP  2 202 934 A1  6/2010
EP  2 706 767 A1  3/2014

OTHER PUBLICATIONS

Enabling session mobility in Full Mesh Conferencing Model Wireless and mobile computing, networking and communications, 2007, WIMOB. IEEE, Oct. 2007.*

(Continued)

*Primary Examiner* — Tanmay Shah
(74) *Attorney, Agent, or Firm* — Jefferson IP Law, LLP

(57) ABSTRACT

A method in which a second electronic device communicates with a neighbor device is provided. The method includes connecting to a first electronic device, receiving first information for a third electronic device from the first electronic device, and controlling the third electronic device using the first information, wherein the first information includes control right information for the third electronic device.

20 Claims, 12 Drawing Sheets

(56) References Cited

U.S. PATENT DOCUMENTS

2010/0215037 A1* 8/2010 Long .................. H04L 65/1063
370/352
2014/0080469 A1* 3/2014 Ko .......................... H04W 4/20
455/418

OTHER PUBLICATIONS

XP031338332 "Enabling Session Mobility in Full Mesh Conferencing Model" Oct. 8, 2007.

* cited by examiner

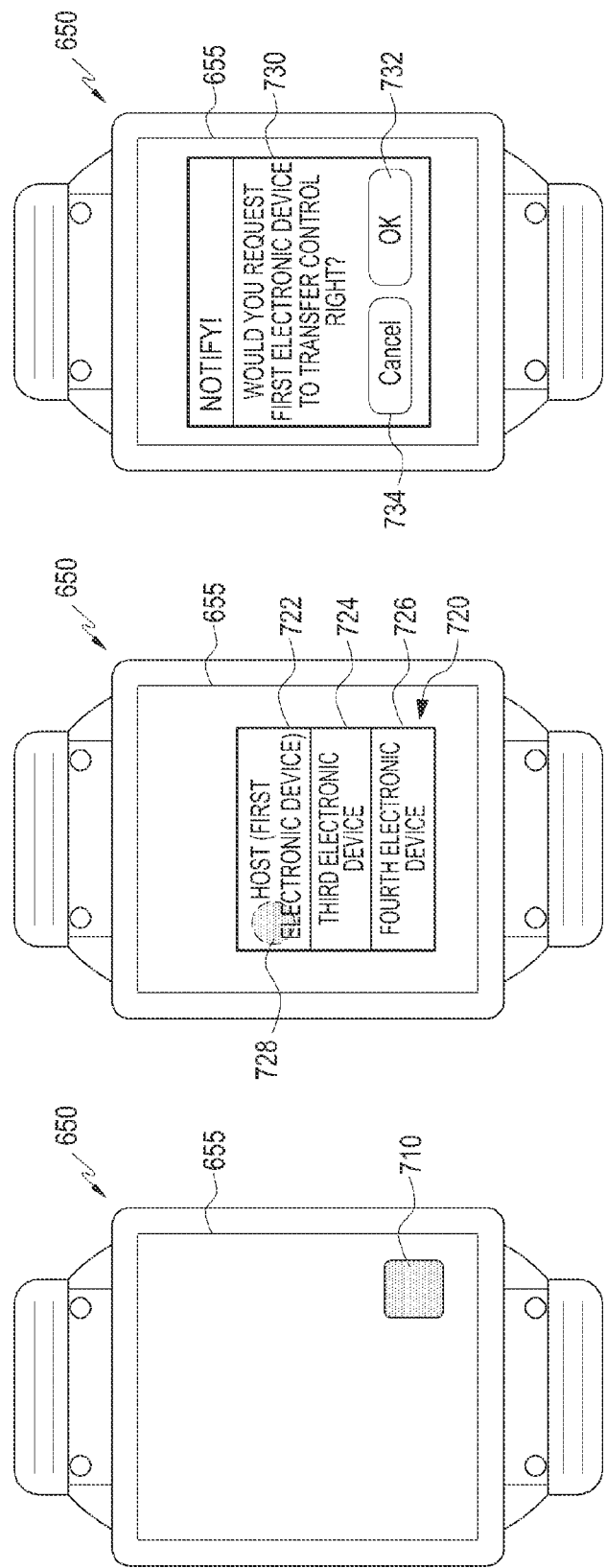

METHOD FOR COMMUNICATING WITH NEIGHBOR DEVICE, ELECTRONIC DEVICE, AND STORAGE MEDIUM

CROSS-REFERENCE TO RELATED APPLICATION(S)

This application claims the benefit under 35 U.S.C. §119(a) of a Korean patent application filed on Feb. 22, 2014 in the Korean Intellectual Property Office and assigned Serial number 10-2014-0020992, the entire disclosure of which is hereby incorporated by reference.

TECHNICAL FIELD

The present disclosure relates to an electronic device having communication capability. More particularly, the present disclosure relates to a method and apparatus for communicating with a neighbor device.

BACKGROUND

An electronic device (for example, a smart phone) can provide various application functions, such as a clock, a calendar, a memo note, a search function, a map, news, and a real-time camera, as well as supporting mobile communication capability. A user may operate such various functions using the electronic device.

The electronic device can be used in connection to wearable devices and Bluetooth accessories.

Along with variation of functions of wearable devices, many wearable devices can be used independently and separately from electronic devices. When a user cannot possess an electronic device due to exercise, climbing, swimming, or the like, he/she also cannot continue to use Bluetooth accessories or wearable electronic devices connected to the electronic device although any one of the wearable devices can replace the electronic device.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for communicating with a neighbor device.

In accordance with an aspect of the present disclosure, a method in which a second electronic device communicates with a neighbor device is provided. The method includes connecting to a first electronic device, receiving first information for a third electronic device from the first electronic device, and controlling the third electronic device using the first information, wherein the first information includes control right information for the third electronic device.

In accordance with another aspect of the present disclosure, the control right information may include information for transferring a control right of the first electronic device with respect to the third electronic device to the second electronic device.

In accordance with another aspect of the present disclosure, the first information may include connection information for the third electronic device.

In accordance with another aspect of the present disclosure, the connection information for the third electronic devices may include at least one of identification information of the third electronic device and network setting information.

In accordance with another aspect of the present disclosure, the controlling of the third electronic device may include connecting to the third electronic device using the first information.

In accordance with another aspect of the present disclosure, the method may further include transmitting second information for the third electronic device to the first electronic device, and disconnecting from the third electronic device, wherein the second information includes control right information for the third electronic device.

In accordance with another aspect of the present disclosure, the control right information of the second information may include information for returning a control right of the second electronic device with respect to the third electronic device to the first electronic device.

In accordance with another aspect of the present disclosure, the first information may include information about content of a service.

In accordance with another aspect of the present disclosure, the information about the content of the service may include identification information of the service, identification information of an application that outputs the content, identification information of the content, connection information of a server, or setting information for outputting the content.

In accordance with another aspect of the present disclosure, the controlling of the third electronic device may include transmitting content of a service to the third electronic device using the first information.

In accordance with another aspect of the present disclosure, the method may further include receiving content of a service from a server, using the first information.

In accordance with another aspect of the present disclosure, the method may further include detecting an event needing a transfer of a control right, wherein the event occurs according to at least one of an input from a user, a request from the first electronic device, and a distance between the first electronic device and the second electronic device.

In accordance with another aspect of the present disclosure, the method may further include outputting a notification for informing a user that a control right is transferred.

In accordance with another aspect of the present disclosure, the controlling of the third electronic device may start according to a user's response to the notification.

In accordance with another aspect of the present disclosure, the method may further include receiving an input for requesting a control right, from a user, and transmitting a control right transfer request to the first electronic device, in response to the input from the user.

In accordance with another aspect of the present disclosure, the method may further include displaying information for enabling the user to select a target which the user requests for the control right.

In accordance with another aspect of the present disclosure, a non-transitory machine-readable storage medium storing a program to execute a method in which a second electronic device communicates with a neighbor device is provided. The method includes connecting to a first electronic device, receiving first information for a third electronic device from the first electronic device, and controlling the third electronic device using the first information, wherein the first information includes control right information for the third electronic device.

In accordance with another aspect of the present disclosure, a second electronic device for communicating with a neighbor device is provided. The electronic device includes a communication module, and a processor configured to connect to a first electronic device through the communication module, to receive first information for a third electronic device from the first electronic device through the communication module, and to control the third electronic device using the first information, wherein the first information includes control right information for the third electronic device.

In accordance with another aspect of the present disclosure, a method in which a first electronic device communicates with a neighbor device is provided. The method includes connecting to a second electronic device, transmitting first information for a third electronic device to the second electronic device, and disconnecting from the third electronic device, wherein the first information includes control right information for the third electronic device.

In accordance with another aspect of the present disclosure, the control right information may include information for transferring a control right of the first electronic device with respect to the third electronic device to the second electronic device.

In accordance with another aspect of the present disclosure, the first information may include connection information for the third electronic device.

In accordance with another aspect of the present disclosure, the connection information for the third electronic device may include at least one of identification information of the third electronic device and network setting information.

In accordance with another aspect of the present disclosure, the method may further include receiving second information for the third electronic device from the second electronic device, and controlling the third electronic device using the second information, wherein the second information includes control right information for the third electronic device.

In accordance with another aspect of the present disclosure, the control right information of the second information may include information for returning a control right of the second electronic device with respect to the third electronic device to the first electronic device.

In accordance with another aspect of the present disclosure, the first information may include information about content of a service.

In accordance with another aspect of the present disclosure, the information about the content of the service may include identification information of the service, identification information of an application that outputs the content, identification information of the content, connection information of a server, and setting information for outputting the content.

In accordance with another aspect of the present disclosure, the method may further include detecting an event needing a transfer of the control right, wherein the event occurs according to at least one of an input from a user, a request from the second electronic device, and a distance between the first electronic device and the second electronic device.

In accordance with another aspect of the present disclosure, a non-transitory machine-readable storage medium storing a program to execute a method in which a first electronic device communicates with a neighbor device is provided. The method includes connecting to a second electronic device, transmitting first information for a third electronic device to the second electronic device, and disconnecting from the third electronic device, wherein the first information includes control right information for the third electronic device.

In accordance with another aspect of the present disclosure, a first electronic device of communicating with a neighbor device is provided. The electronic device includes a communication module, and a processor configured to connect to a second electronic device through the communication module, to transmit first information for a third electronic device to the second electronic device, and to disconnect from the third electronic device, wherein the first information includes control right information for the third electronic device.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 6A, 6B, 7A, 7B, 7C, 8, 9A, 9B, 10, 11A and 11B are views for describing a method of communicating with neighbor devices according to various embodiments of the present disclosure;

Throughout the drawings, like reference numerals will be understood to refer to like parts, components, and structures.

DETAILED DESCRIPTION

Figure 1:
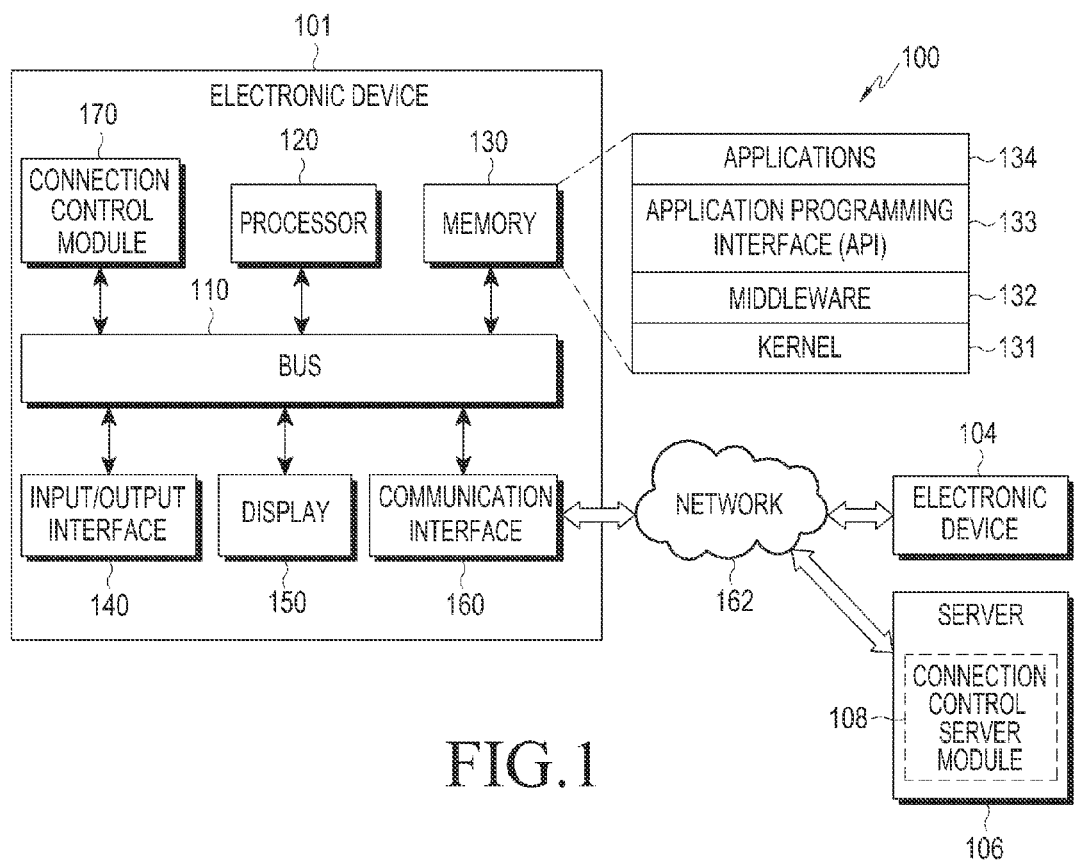
FIG. 1 is a block diagram illustrating a network environment including an electronic device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, the term "or" includes any and all combinations of one or more of the associated listed items. For example, "A or B" may include A, B, or both A and B.

It will be understood that, although the terms first, second, etc. may be used herein to describe various components, these components should not be limited by these terms. For example, the terms do not limit the order and/or importance of the components. These terms are only used to distinguish one component from another. For example, a first user device and a second user device that are user devices indicate different user devices. For example, a first component could be termed a second component, and, similarly, a second component could be termed a first component, without departing from the scope of the present disclosure.

It will be understood that when a component is referred to as being "connected" or "coupled" to another component, it can be directly connected or coupled to the other component or intervening components may be present. In contrast, when a component is referred to as being "directly connected" or "directly coupled" to another component, there are no intervening components present.

The terminology used herein is for the purpose of describing particular embodiments only and is not intended to be limiting of the present disclosure.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

An electronic device according to various embodiments of the present disclosure may be a device with communication capability. For example, the electronic device may be at least one of (i.e., any one or a partial or whole combination of) a smart phone, a tablet Personal Computer (PC), a mobile phone, a video phone, an e-Book reader, a desktop PC, a laptop PC, a Netbook computer, a Personal Digital Assistant (PDA), a Portable Multimedia Player (PMP), a digital audio player, mobile medical equipment, a camera, or a wearable device (for example, a Head-Mounted-Device (HMD) such as electronic glasses, electronic clothes, electronic bracelet, electronic necklace, electronic Accessory, electronic tattoo, or smart watch).

According to some embodiments, the electronic device may be a smart home appliance with communication capacity. The smart home appliance may be at least one of a Television (TV), a Digital Versatile Disk (DVD) player, audio equipment, a refrigerator, an air conditioner, a cleaner, an oven, a microwave, a washing machine, an air cleaner, a set-top box, a TV box (for example, Samsung HomeSync™, Apple TV™, Google TV™, or the like), game consoles, electronic dictionary, a camcorder, or an electronic album.

According to some embodiments, the electronic device may be at least one of various medical equipment (for example, Magnetic Resonance Angiography (MRA), Magnetic Resonance Imaging (MRI), Computed Tomography (CT), medical camcorder, ultrasonic equipment, and the like), a navigation device, a Global Positioning System (GPS) receiver, an Event Data Recorder (EDR), a Flight Data Recorder (FDR), an automotive infotainment device, electronic equipment for ship (for example, marine navigation device, gyro compass, and the like), avionics, security equipment, a head unit for vehicle, an industrial or home robot, an Automatic Teller Machine (ATM) of bank, or a Point of Sales (PoS) of store.

According to some embodiments, the electronic device may be at least one of furniture or part of building/structure with communication capability, an electronic board, an electronic signature receiving device, a projector, or various metering equipment (for example, water, electricity, gas, or waves metering equipment). The electronic device may be one of the aforementioned devices or a combination of one or more of the aforementioned devices. Also, the electronic device may be a flexible device. It will be apparent to those of ordinary skill in the art that the electronic device according to various embodiments of the present disclosure is not limited to the aforementioned devices.

Hereinafter, an electronic device according to various embodiments of the present disclosure will be described with reference to the appended drawings. In the following description, the term "user" may indicate a person or an apparatus (for example, an intelligent electronic device) that uses the electronic device.

FIG. 1 is a block diagram illustrating a network environment including an electronic device according to various embodiments of the present disclosure.

Referring to FIG. 1, a network environment 100 may include an electronic device 101, a network 162, an electronic device 104, and a server 106. The electronic device 101 may include a bus 110, a processor 120, a memory 130, an input/output interface 140, a display 150, and a communication interface (or a communication module) 160, and a connection control module 170.

The bus 110 may be a circuit to connect the aforementioned components to each other, and to allow communications (for example, transmission of control messages) between the aforementioned components.

The processor 120 may receive commands from the aforementioned components (for example, the memory 130, the input/output interface 140, the display 150, the communication interface 160, or the connection control module 170) through the bus 110, interpret the received commands, and perform operations or data processing according to the interpreted commands.

The memory 130 may store commands or data received from or created by the processor 120 or the components (for example, the input/output interface 140, the display 150, the communication interface 160, or the connection control module 170). The memory 130 may include programming modules, such as, for example, a kernel 131, middleware 132, an Application Programming Interface (API) 133, an application 134 or the like. Each of the programming modules may be software, firmware, hardware, or a combination of two or more of the aforementioned devices.

The kernel 131 may control or manage system resources (for example, the bus 110, the processor 120, or the memory 130) which the other programming modules (for example, the middleware 132, the API 133, or the application 134) use to execute their operations or functions. Also, the kernel 131 may provide an interface to enable the middleware 132, the API 133, or the application 134 to access individual components of the electronic device 101 and to control or manage the components.

The middleware 132 may act as an intermediary so that the API 133 or the application 134 can communicate with the kernel 131 to receive/transmit data from/to the kernel 131. Also, the middleware 132 may perform, when operation requests are received from the application 134 (or a plurality of applications 134), controlling (for example, scheduling or load balancing) for the operation requests, for example, by allocating priority for a system resource (for example, the bus 110, the processor 120, or the memory 130) of the electronic device 101 to the application 134 (at least one of the plurality of applications 134).

The API 133 may be an interface to enable the application 134 to control functions that are provided by the kernel 131 or the middleware 132. The API 133 may include at least one interface or function (for example, commands), for example, for file control, window control, image processing, characters control, or the like.

According to various embodiments, the application 134 may be a Short Message Service (SMS)/Multimedia Messaging Service (MMS) application, an E-mail application, a calendar application, an alarm application, a health care application (for example, an application of measuring a workout or blood sugar), or an environmental information application (for example, an application of providing information about pressure, humidity, temperature, etc.). Additionally or alternatively, the application 134 may be an application related to data exchange between the electronic device 101 and an external electronic device (for example, the electronic device 104). The application related to data exchange may be, for example, a notification relay application to transfer specific information to the external electronic device, or a device management application to manage the external electronic device.

For example, the notification relay application may relay notification information generated by another application (for example, a SMS/MMS application, an E-mail application, a health care application, or an environmental information application) of the electronic device 101, to an external electronic device (for example, the electronic device 104). Additionally or alternatively, the notification relay application may receive notification information from an external electronic device (for example, the electronic device 104), and provide the notification information to a user. The device management application control a function of at least one component of the external electronic device that communicates with the electronic device 101, or manage (for example, install, delete, or update) an application or a service (for example, a call service or a message service) that is provided by the external electronic device. For example, the device management application may turn on/off a function of the electronic device 104, or adjust the brightness or the resolution of a display of the electronic device 104.

According to various embodiments, the application 134 may include an application designated according to an attribute (for example, the kind of device) of the external electronic device (for example, the electronic device 104). For example, if the external electronic device is a digital audio player, the application 134 may include an application for playing music. Likewise, if the external electronic device is mobile medical equipment, the application 134 may include an application related to health-care. According to an embodiment, the application 134 may include at least one of an application designated by the electronic device 101 and an application received from an external electronic device (for example, the server 106 or the electronic device 104).

The input/output interface 140 may transfer a command or data received from a user through an input/output device (for example, a sensor, a keyboard, or a touch screen) to the processor 120, the memory 130, the communication interface 160, or the application executing module 170, for example, through the bus 110. For example, the input/output interface 140 may provide data about a user's touch input received through a touch screen to the processor 120. Also, the input/output interface 140 may output a command or data received from the processor 120, the memory 130, the communication interface 160, or the application executing module 170, for example, via the bus 110, through an input/output device (for example, a speaker or a display). For example, the input/output interface 140 may output voice data processed by the processor 120, through a speaker, for a user.

The display 150 may display various information (for example, multimedia data or text data) for a user.

The communication interface 160 may enable the electronic device 101 to communicate with an external electronic device (for example, the electronic device 104 or the server 106). For example, the communication interface 160 may connect to a network 162 through wired or wireless communication to communicate with the external electronic device. The wireless communication may include at least one of Wireless Fidelity (WiFi), WiFi Direct, BlueTooth (BT), Near Field Communication (NFC), GPS, and cellular communication (for example, Long-Term Evolution (LTE), Long-Term Evolution Advanced (LTE-A), Code Division Multiple Access (CDMA), Wideband Code Division Multiple Access (WCDMA), Universal Mobile Telecommunications System (UMTS), Wireless Broadband (WiBro), Global System for Mobile Communications (GSM), and the like). The wired communication may include at least one of a Universal Serial Bus (USB), a High Definition Multimedia Interface (HDMI), Recommended Standard 232 (RS-232), or a Plain Old Telephone Service (POTS).

According to an embodiment, the network 162 may be a telecommunications network. The telecommunications network may include at least one of a computer network, the Internet, the Internet of Thing (IoT), or a telephone network. According to an embodiment, a protocol (for example, a transport layer protocol, a data link protocol, or a physical layer protocol) for communication between the electronic device 101 and an external electronic device may be supported by at least one of the application 134, the API 133, the middleware 132, the kernel 131, or the communication interface 160.

According to an embodiment, the connection control module 170 may perform at least one of operations (or, functions) that are implemented on the electronic device 101, thereby supporting driving of the electronic device 101. For example, the server 106 may include a connection control server module 108 that can support the connection control module 170 implemented on the electronic device 170. For example, the connection control server module 108 may include at least one component of the connection control module 170 to perform at least one of operations that can be performed by the connection control module 170.

The connection control module 170 may process at least one part of information acquired from the other components (for example, the processor 120, the memory 130, the input/output interface 140, or the communication interface 160), and use the processed information by various methods. For example, the connection control module 170 may control at least one function of the electronic device 101 using the processor 120 or independently from the processor 120 such that the electronic device 101 interworks with another electronic device (for example, the electronic device 104 or the server 106). The connection control module 170 may be integrated into the processor 120. According to an embodiment, at least one component of the connection control module 170 may be included in the server 106 (for example, the connection control server module 108), and the server 106 may support at least one operation that is implemented on the connection control module 170 for the connection control module 170. The connection control module 170 will be described in more detail with reference to FIG. 2, below.

Figure 2:
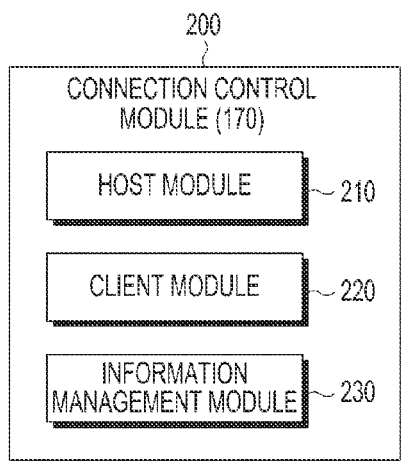
FIG. 2 is a block diagram illustrating a connection control module of an electronic device according to various embodiments of the present disclosure.

FIG. 2 is a block diagram illustrating the connection control module 170 of an electronic device (for example, the electronic device 101) according to various embodiments of the present disclosure. Hereinafter, the electronic device will be referred to as a first electronic device, and first, second, third neighbor devices located adjacent to the electronic device will be referred to as second, third, and fourth electronic devices, respectively.

Referring to the block diagram 200 in FIG. 2, the connection control module 170 may include a host module 210, a client module 220, and an information management module 230. According to an embodiment, in Bluetooth Hands-Free Profile (HFP), the host module 210 may function as an audio gateway, and the client module 220 may function as HandsFree. According to an embodiment, in Bluetooth Advanced Audio Distribution Profile (A2DP), the host module 210 may function as a source of a digital audio stream, and the client module 220 may function as a sink of the digital audio stream. According to an embodiment, the first electronic device may include at least one of a host module and a client module. According to various embodiments, each of the first electronic device (for example, a smart phone) and the second electronic device (for example, a smart watch) may include a host module or both of a host module and a client module. Each of the third electronic device (for example, smart glasses) and the fourth electronic device (for example, a headset) may include a client module.

The host module 210 may control the neighbor devices through another component of the first electronic device. The host module 210 may enable the first electronic device to connect to a neighbor device through a communication interface (for example, the communication interface 160), according to an input from a user, a request from the neighbor device, or a setting. The host module 210 may enable the first electronic device to have a control right (for example, a host right) with respect to the neighbor device or with respect to a service through the neighbor device. The host module 210 may output content of a service to the first electronic device or the neighbor device according to an input from a user or according to a setting. The host module 210 may receive the content of the service from a server through a communication interface.

The service may be a call service, a text service, a voice recognition service, a schedule management service, a word processor application, a music service, an Internet service, a map service, a camera service, an E-mail service, an image editing service, a search service, a file search service, a video service, a game service, a Social Networking Service (SNS) service, a message service, a handwriting service, a text input service (or a keyboard/keypad service), a cursor service, a streaming service, or a mirroring service.

The host module 210 may detect a first event needing a transfer of the control right or a change of a host. The first event may occur according to an input from a user, a request from a neighbor device, or a distance between the electronic device and a neighbor device.

According to various embodiments, the host module 210 may receive an input from a user through an input/output interface (for example, the input/output interface 140), the communication interface 160, or the display (for example, the display 150). The user may select a button, an icon, or a menu item through the input/output interface or the display, may input a voice instruction through a microphone of the input/output interface, or may input a gesture or motion through a camera of the first electronic device.

According to various embodiments, the host module 210 may receive a request for transferring a control right or a request for changing a host, wirelessly, from the neighbor device, through the communication interface.

The host module 210 may detect a change in distance between the first electronic device and the neighbor device through the communication interface. According to various embodiments, the host module 210 may detect a change in distance between the first electronic device and the neighbor device, based on a change in intensity of a signal received from the neighbor device. According to various embodiments, if an intensity value of a signal received from at least one of the second, third, and fourth electronic devices is equal to or lower than a predetermined threshold value while the first electronic device controls at least one of the second, third, and fourth electronic devices, the host module 210 may determine that a first event needing a transfer of a control right or a change of a host has occurred.

If the host module 210 determines that a first event needing a transfer of a control right or a change of a host has occurred while the first electronic device controls the third and/or fourth electronic device, the host module 210 may transfer first information for the third and/or fourth electronic device to the second electronic device through the communication interface so that the second electronic device can control the third and/or fourth electronic device. That is, the host module 210 may transfer a control right for the third and/or fourth electronic device to the second electronic device. The first information may include control right information for the third and/or fourth electronic device, connection information for the third and/or fourth electronic device, and/or information about content of a service. The first electronic device may perform synchronization of the first information with the second electronic device, before the first event occurs. According to various embodiments, the first electronic device may search for at least one neighbor device having host capability, and then transmit the entire or a part of the first information to the found neighbor device at regular time intervals, or transmit the first information to the neighbor device and then transmit, whenever there is a change in the first information, the first information to the neighbor device.

According to various embodiments, the information about the content of the service may include at least one of identification information of the service, identification information of an application that outputs the content, identification information of the content, connection information of the server, and setting information for outputting the content.

According to various embodiments, the connection information for the third and/or fourth electronic device may include identification information of the third and/or fourth electronic device or network setting information of the third and/or fourth electronic device. The network setting information may include at least one of information about at least one communication protocol that is supported by the third and/or fourth electronic device, information about a communication protocol that is used to transmit the content of the service to the third and/or fourth electronic device, a Media Access Control (MAC) address of the third and/or fourth electronic device, and a Service Set IDentifier (SSID) of the third and/or fourth electronic device.

Thereafter, the host module 210 may detect a second event needing a transfer of a control right or a change of a host. Then, the host module 210 may receive the control right for the third and/or fourth electronic device transferred to the second electronic device according to occurrence of the first event, from the second electronic device. The second event may occur according to at least one of an input from the user, a request from the first or second electronic device, and distances between the first to fourth electronic devices. According to various embodiments, if an intensity value of a signal received from the second electronic device is equal to or greater than a predetermined threshold value (for example, when the first electronic device is close to the second electronic device), or if an intensity value of a signal received from the third and/or fourth electronic device is equal to or smaller than a predetermined threshold value (for example, since the second electronic device has moved away from the third and/or fourth electronic device), the host module 210 may determine that the second event needing a transfer of a control right or a change of a host has occurred.

If a second event needing a transfer of a control right or a change of a host occurs while the second electronic device controls the third and/or fourth electronic device, the host module 210 may receive second information for the third and/or fourth electronic device from the second electronic device through the communication interface. That is, the host module 210 may receive the control right for the third and/or fourth electronic device from the second electronic device. Specifically, the host module 210 may transmit a control right return request to the second electronic device through the communication interface. The second information may include the control right information for the third and/or fourth electronic device, the connection information for the third and/or fourth electronic device, and/or the information about the content of the service.

Thereafter, the host module 210 may connect to the third and/or fourth electronic device, based on at least one of the connection information of the second information, history (for example, the connection information of the first information) about the previous connection to the third and/or fourth electronic device, and information acquired during a process of searching for a new neighbor device.

The host module 210 may resume the service stopped or to be stopped by the second electronic device, using the information about the content of the service included in the second information. According to various embodiments, the host module 210 may transmit the content of the service to the connected third and/or fourth electronic device, wherein the content of the service may have been stored in a memory (for example, the memory 130) of the first electronic device or received from the server.

If an event needing a transfer of a control right or a change of a host occurs while the first electronic device provides the service through the third and/or fourth electronic device, the host module 210 may transmit first information for the service to the second electronic device through the communication interface so that the third and/or fourth electronic device can continue to provide the service. The first information for the service may include the information about the content of the service. According to various embodiments, the information about the content of the service may include at least one of the identification information of the service, the identification information of the application that outputs the content, the identification information of the content, the connection information of the server, and the setting information for outputting the content.

The client module 220 may control other components of the first electronic device so that the first electronic device operates according to the control of a neighbor device. The client module 220 may enable the first electronic device to connect to a neighbor device through the communication interface, according to an input from a user, a request from the neighbor device, or a setting. The client module 220 may enable the first electronic device to operate according to the control of the neighbor device. The client module 220 may receive content of a service from the neighbor device through the communication interface, and output the received content of the service.

The information management module 230 may manage information needed for communication between the first electronic device and the neighbor device. The information management module 230 may store control right information for the neighbor device, connection information for the neighbor device, and/or information about content of a service, in the memory.

According to various embodiments, the information about the content (for example, audio, video, a search list, document, a schedule, or alarm) of the service may include identification information of the service, identification information (for example, a music application or a video application) of an application that outputs the content, identification information (for example, an address of streaming content or a play list) of the content, connection information (for example, an address of a streaming server, an address of a voice recognition server, an address of a search server, an address of a SNS server, session information (a kind of a session or a session identifier), an Internet Protocol (IP) address, etc.) of the server, setting information (for example, a volume value, a vibration setting value, a notification setting value, or display resolution) for outputting the content, or service authentication information (for example, an ID, a password, or an account).

According to various embodiments, the connection information for the neighbor device may include identification information (for example, a device ID, user information, a phone number, an user account, or an IP address) of the neighbor device, network setting information of the neighbor device, or device capability of the neighbor device, and the network setting information may include information about at least one communication protocol that is supported by the neighbor device, information about a communication protocol used to transmit the content of the service to the neighbor device, a MAC address of the neighbor device, a Service Set ID (SSID) of the neighbor device, or a password for connection with the neighbor device.

The control right information may include a kind (for example, a host or a client) of the control right, control right control information, such as ownership of the control right, transfer of the control right, delegation of the control right, or return of the control right, or information about a target (for example, a service or an application) to be controlled.

The information management module 230 may classify and manage information about various services according to service IDs or IP flows.

Figure 3:
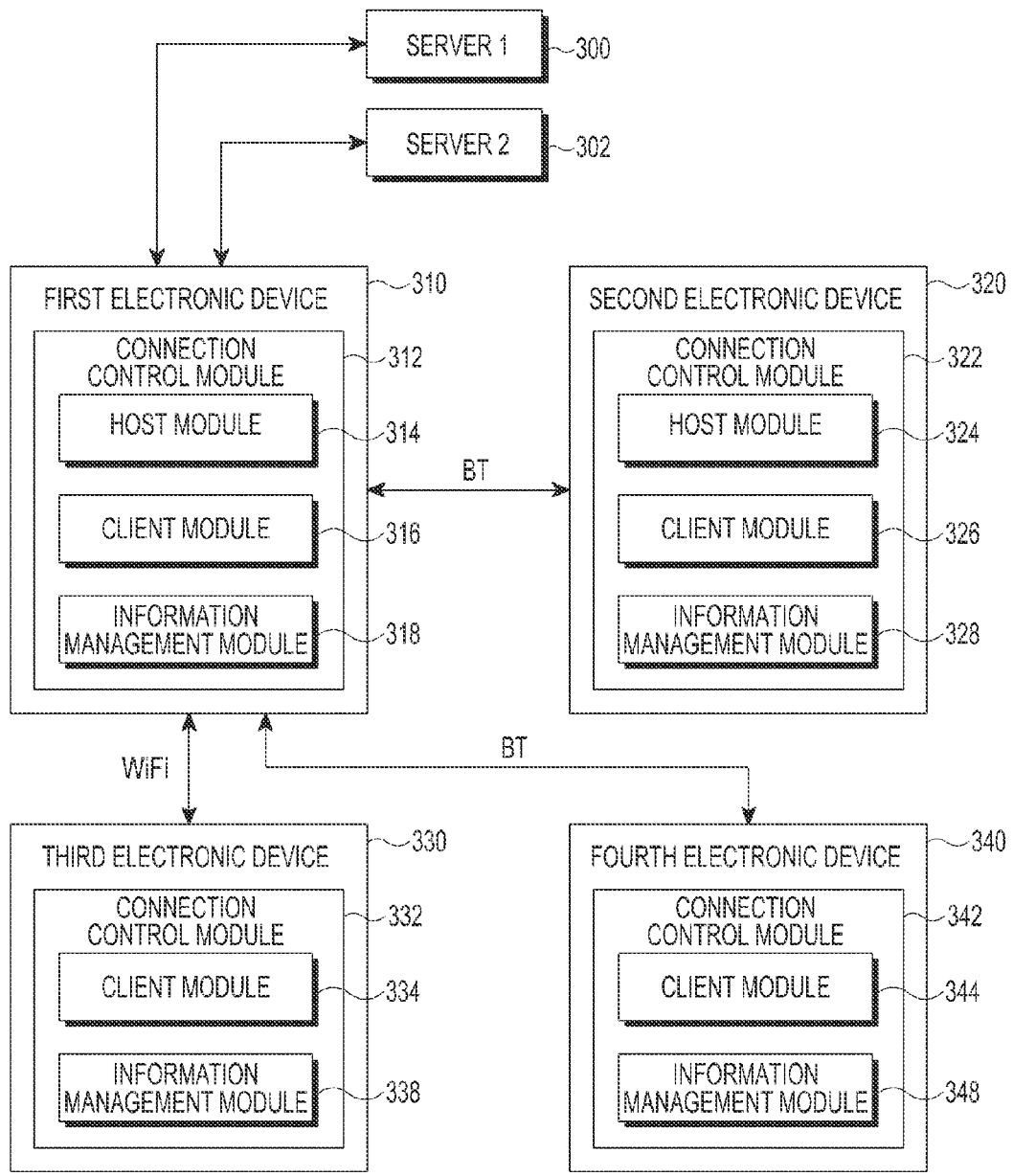
FIGS. 3 and 4 are views for describing a method for communicating with neighbor devices according to various embodiments of the present disclosure.
Figure 4:
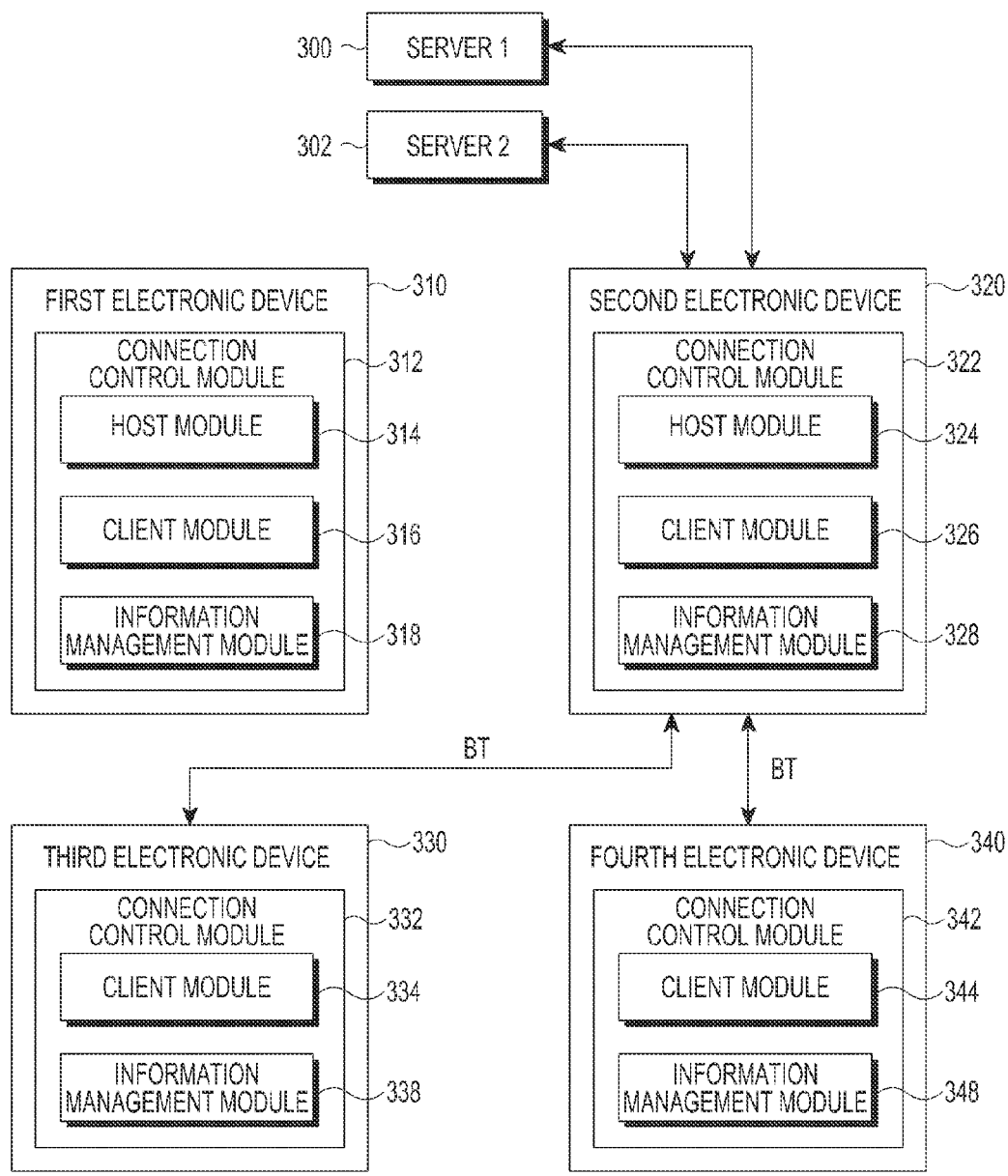

FIGS. 3 and 4 are views for describing a method for communicating with neighbor devices according to various embodiments of the present disclosure.

Referring to FIG. 3, a case in which a first electronic device 310 controls second, third, and fourth electronic devices 320, 330, and 340 is assumed.

The first electronic device 310 may include a first connection control module 312, and the first connection control module 312 may include a first host module 314, a first client module 316, and a first information management module 318. The first electronic device 310 may connect to first and second servers 300 and 302, and to the second, third, and fourth electronic devices 320, 330, and 340. According to various embodiments, the first electronic device 310 may be a smart phone that supports WiFi function (or protocol) and Bluetooth function (or protocol).

The second electronic device 320 may include a second connection control module 322, and the second connection control module 322 may include a second host module 324, a second client module 326, and a second information management module 328. The second electronic device 320 may connect to the first electronic device 310. According to various embodiments, the second electronic device 320 may be a wearable electronic device such as a smart watch that supports Bluetooth function (or protocol).

The third electronic device 330 may include a third connection control module 332, and the third connection control module 332 may include a third client module 334 and a third information management module 338. The third electronic device 330 may connect to the first electronic device 310. According to various embodiments, the third electronic device 330 may be a wearable electronic device such as smart glasses that supports a WiFi function (or protocol) and a Bluetooth function (or protocol).

The fourth electronic device 340 may include a fourth connection control module 342, and the fourth connection control module 342 may include a fourth client module 344 and a fourth information management module 348. The fourth electronic device 340 may connect to the first electronic device 310. According to various embodiments, the fourth electronic device 340 may be a headset that supports the Bluetooth function (or protocol).

The first electronic device 310 may function as a host with respect to the second, third, and fourth electronic devices 320, 330, and 340, and the second, third, and fourth electronic devices 320, 330, and 340 may function as clients with respect to the first electronic device 310.

The first electronic device 310 may WiFi connect to the third electronic device 330, and provide a voice recognition service through the third electronic device 330 and the first server 300. According to various embodiments, if a user inputs voice information to the third electronic device 330, the third electronic device 330 may transmit the voice information to the first electronic device 310 through a WiFi connection, and the first electronic device 310 may transmit the voice information to the first server 300 through a network. The first server 300, which may correspond to a voice recognition server, may convert the received voice information into text information, and transmit the results of a search corresponding to the text information and/or the text information (that is, response information of the first server 300) to the first electronic device 310. The first electronic device 310 may transmit the response information of the first server 300 to the third electronic device 330 through a WiFi connection, and the third electronic device 330 may provide the response information of the first server 300 to the user.

The first electronic device 310 may Bluetooth connect to the fourth electronic device 340, and provide a streaming service (or a call service) through the fourth electronic device 340 and the second server 302. According to various embodiments, the second server 302 may correspond to a streaming server, and transmit an audio stream to the first electronic device 310. The first electronic device 310 may transmit the audio stream to the fourth electronic device 340 through a Bluetooth connection, and the fourth electronic device 340 may output the audio stream.

Referring to FIG. 4, a case in which a control right of the first electronic device 310 is transferred to the second electronic device 320 according to movement of the first electronic device 310 is assumed.

The first electronic device 310 may detect the occurrence of a first event according to movement of the first electronic device 310 or according to a host change request from a user, select a neighbor device (for example, the second electronic device 320) having host capability from among neighbor devices in response to the detection of the first event, and transmit first information for neighbor devices (for example, the third electronic device 330 and the fourth electronic device 340) to the second electronic device 320. The first information may include control right information for the neighbor devices, connection information for the neighbor devices, and/or information about content of a service.

An example of the first information is as follows.

TABLE 1

| Device ID (P_ID) | Connection State | Kind of Connection | Service ID (S_ID) | Control Right Information | ... |
|---|---|---|---|---|---|
| P_ID3 | Connected | WiFi (or BT) | S_ID1 (Voice Recognition) | Active (Host) | ... |
| P_ID4 | Connected | BT | S_ID2 (Streaming) | Active (Host) | ... |

The first information may further include an address of streaming content, service authentication information (for example, an ID, a password, or an account), a time or location at which reproduction of streaming content is stopped, a streaming play list, an audio volume setting value, application identification information, and/or service-related display resolution.

As described above, the first electronic device 310 may select, before the first event occurs, a neighbor device (for example, the second electronic device 320) having host capability from among neighbor devices, and transmit first information for neighbor devices (for example, the third electronic device 330 and the fourth electronic device 340) to the second electronic device 320. First information that is transmitted from the first electronic device 310 to the second electronic device 320 after the first event occurs may include control right information (for example, information for transferring the control right to the second electronic device 320) for the neighbor devices.

After transferring the control right to the second electronic device 320, the first electronic device 310 may disconnect from the third and fourth devices 330 and 340, disable host capability with respect to the third and fourth electronic devices 330 and 340, or stop providing the service through the third and fourth electronic devices 330 and 340.

The control right information may designate a time (for example, immediately or after a predetermined time period elapses (for example, after one second elapses from when the control right is transferred)) at which the service is resumed by the second electronic device 320.

After receiving the control right, the second electronic device 320 may provide a voice recognition service through the third electronic device 330 and the first server 300. According to various embodiments, if the second electronic device 320 receives the control right after a user's voice information is transmitted to the first server 300, the second electronic device 320 may receive response information of the first server 300 from the first server 300 through the network, and transmit the response information of the first server 300 to the third electronic device 330 through a Bluetooth connection. Then, the third electronic device 330 may provide the response information of the first server 300 to the user. The second electronic device 320 may convert the WiFi connection which is the previous connection to the third electronic device 330, into a Bluetooth connection that can be supported by both the second and third electronic devices 320 and 330.

After receiving the control right, the second electronic device 320 may provide a streaming service (or a call service) through the fourth electronic device 340 and the second server 302. According to various embodiments, if the second electronic device 320 receives the control right after a portion of a music file having a total play time of 4 minutes is played for 1 minute, the second electronic device 320 may receive an audio steam corresponding to a remaining portion of the music file to be played for 3 minutes, from the second server 302, and transmit the audio stream to the fourth electronic device 340 through a Bluetooth connection. Then, the fourth electronic device may output the audio stream.

Figure 5:
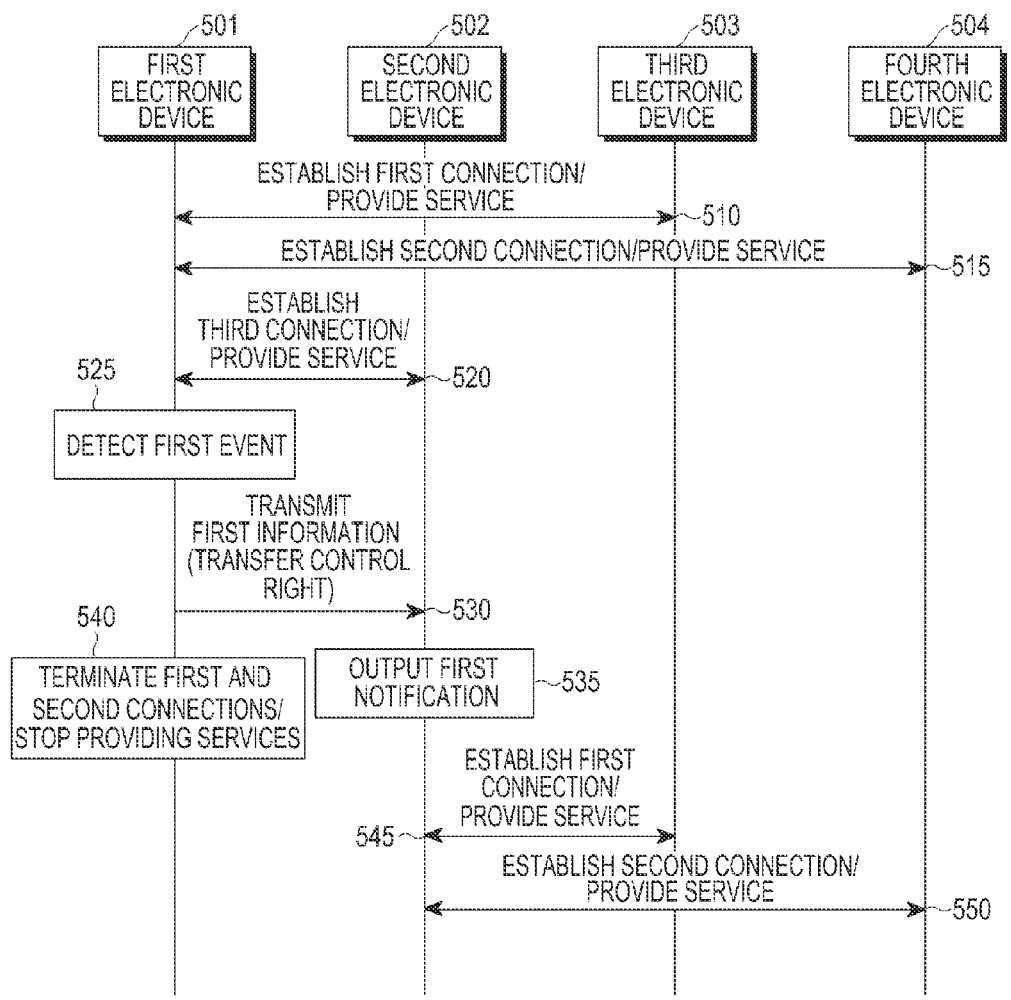
FIG. 5 is a flowchart illustrating a method of communicating with neighbor devices according to various embodiments of the present disclosure.

FIG. 5 is a flowchart illustrating a method of communicating with neighbor devices according to various embodiments of the present disclosure. The method of communicating with neighbor devices may include operations 510 to 550.

In operation 510, a first electronic device 501 may establish a first communication connection (for example, pairing or a host/client connection) to a third electronic device 503, and provide a first service through the third electronic device 503.

In operation 515, the first electronic device 501 may establish a second communication connection (for example, pairing or a host/client connection) to a fourth electronic device 504, and provide a second service through the fourth electronic device 504.

In operation 520, the first electronic device 501 may establish a third communication connection (for example, pairing or a host/client connection) to a second electronic device 502, and provide a third service through the second electronic device 502.

In operation 525, the first electronic device 501 may detect a first event needing a change of an owner of a control right or a change of a host. The first event may occur according to at least one of an input from a user, a request from a neighbor device, and a distance between the first electronic device 501 and a neighbor device. Also, the second electronic device 502 may detect an event needing a change of an owner of a control right or a change of a host, and transmit a request for changing an owner of a control right or a host to the first electronic device 501.

In operation 530, the first electronic device 501 may transmit first information for transferring a control right, to the second electronic device 502, in response to the detection of the first event. According to various embodiments, the first information may include an indicator (for example, a field value of a predetermined field of a data frame is set to 1) representing a transfer of a control right, control right information for neighbor devices, connection information for neighbor devices, and/or information about content of a service. According to various embodiments, the control right information for the neighbor devices, the connection information for the neighbor devices, and/or the information about the content of the service may have been transmitted to the second electronic device 502 through periodic/non-periodic synchronization between the first electronic device 501 and the second electronic device 502, before the first event is detected. Such a synchronization request may be performed by the first electronic device 501 or the second electronic device 502. Transferring a control right between the first electronic device 501 and the second electronic device 502 may be automatically done without a user's intervention.

FIGS. 6A to 11B are views for describing a method of communicating with neighbor devices according to various embodiments of the present disclosure.

Figure 6A:
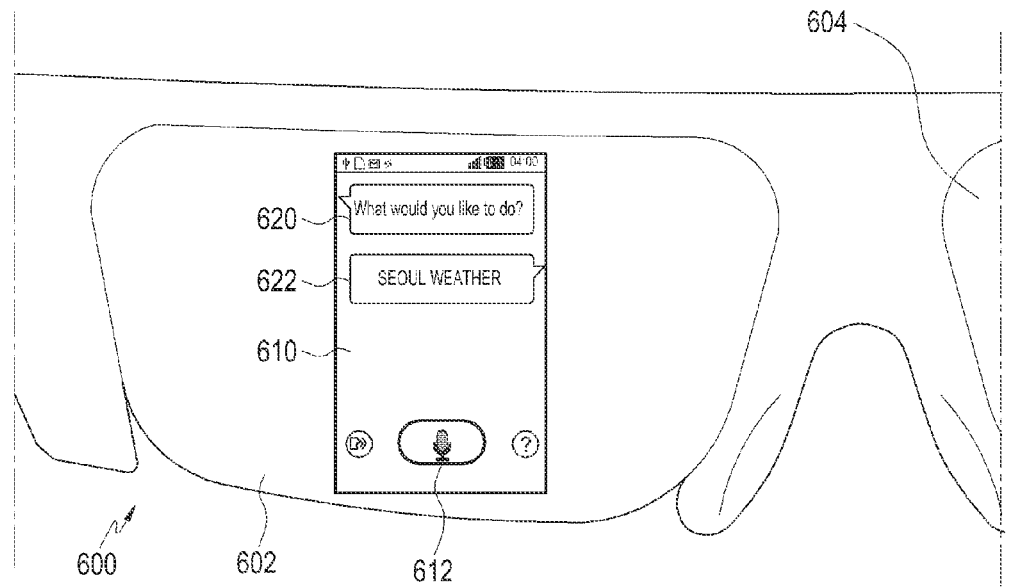

Referring to FIG. 6A, while a first electronic device provides a first service (for example, a voice recognition service) through a first server and a third electronic device 600, a first event needing a change of an owner of a control right or a change of a host may be detected.

In the current example, the third electronic device 600 may be smart glasses that is in the shape of glasses including a first glass 602 and a second glass 604.

A user may execute a voice recognition application on the third electronic device 600. In response to the execution of the voice recognition application, the third electronic device 600 may display an application screen 610, through the first glass 602, for the user. In FIG. 6A, the application screen 610 may not be a screen displayed actually on the first glass 601 but may be a screen shown by the user's eyes. Also, the same application screen as the application screen 610 may be displayed on the second glass 604.

When the voice recognition application is initially executed, guidance words 620 such as "What would you like to do" may be displayed on the application screen 610.

In the lower portion of the application screen 610, a voice recognition button 612 to execute a voice recognition mode may be provided. Optionally, a voice guidance button to guide a use method with voice when the voice recognition button 612 is selected may be provided in one side of the voice recognition button 612, and also, optionally, a help button to display examples of the use method may be provided in the other side of the voice recognition button 612.

According to various embodiments, the user may input a desired instruction (in the current example, information 622 of content "Seoul Weather") with voice through a microphone of the third electronic device 600. In order to transfer the control right according to the detection of the first event, the first electronic device may pause or stop providing the voice recognition service (for example, a response to voice information 622 representing "Seoul Weather").

Figure 6B:
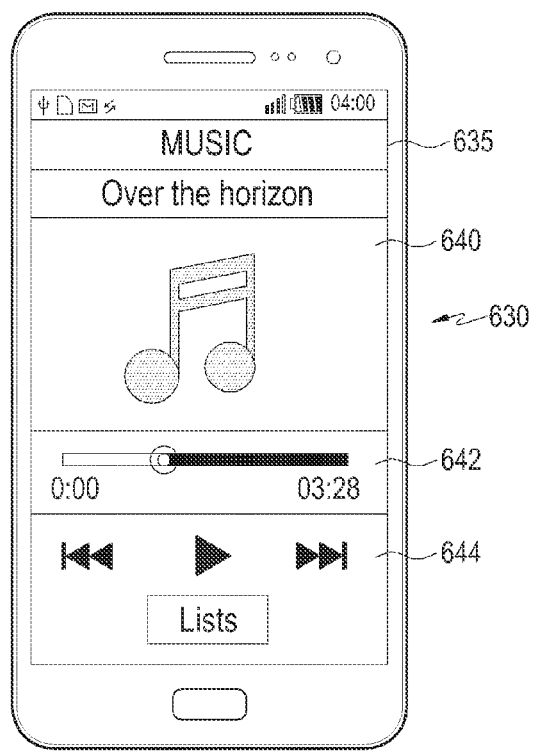

Referring to FIG. 6B, while a first electronic device 630 provides a second service (for example, an audio streaming service) through a second server and a fourth electronic device, a first event needing a change of an owner of a control right or a change of a host may be detected. In the current example, the first electronic device 630 may be a smart phone with a display 635.

A user may execute an audio streaming application on the first electronic device 630. In response to the execution of the audio streaming application, the first electronic device 630 may display an application screen 640 for the user.

The audio streaming application may play music selected by the user or set to default, and display a title, play time information 642, etc. of the music being played, on the application screen 640. In the lower portion of the application screen 640, menu items 644 including a play/pause button, a next track button, and a previous track button, and a Lists button to display a list of selectable music may be provided.

According to various embodiments, the first electronic device 630 may receive an audio stream from a second server, and output the audio stream through the fourth electronic device. In order to transfer a control right according to the detection of the first event, the first electronic device 630 may pause or stop providing the audio streaming service (for example, playing a music file having a title "over the horizon" stored in the second server).

According to an embodiment, pausing or stopping providing the service may be performed after the first electronic device 630 transmits first information to a second electronic device and receives a response to the first information from the second electronic device.

Referring again to FIG. 5, in operation 535, after receiving the first information, the second electronic device 502 may output a first notification for informing the user that the owner of the control right has changed. The first notification may be provided by at least one of generating a sound, generating a vibration, and displaying a message. Also, the first notification may be output through at least one of the first to fourth electronic devices 501 to 504.

Referring to FIG. 7A, a second electronic device 650 may display an icon 710 for requesting a control right, on a display 655. In the current example, the second electronic device 650 may be a smart watch with the display 655.

If a user selects the icon 710, as shown in FIG. 7B, the second electronic device 650 may display a list 720 of neighbor devices using first information received from a first electronic device, on the display 655. The list 720 may include identifiers 722, 724, and 726 for the first, third, and fourth electronic devices, and may include host/client information. For example, the user may select an identifier of the first electronic device to request the first electronic device to transfer a control right for the third or fourth electronic device or to transfer all control rights owned by the first electronic device.

For example, if the user selects the identifier 722 of the first electronic device at reference numeral 728, as shown in FIG. 7C, the second electronic device 650 may display a notification message 730 for a first notification, through the display 655, for the user.

The notification message 730 may include guidance words "Would you request first electronic device to transfer control right?", and include an OK button 732 for confirming the control right transfer request and a Cancel button 734 for cancelling the control right transfer request. If the user selects the OK button 732, the second electronic device 650 may transmit the control right transfer request to the first electronic device. If the user selects the Cancel button 734, the second electronic device 650 may cancel the control right transfer request.

Figure 8:
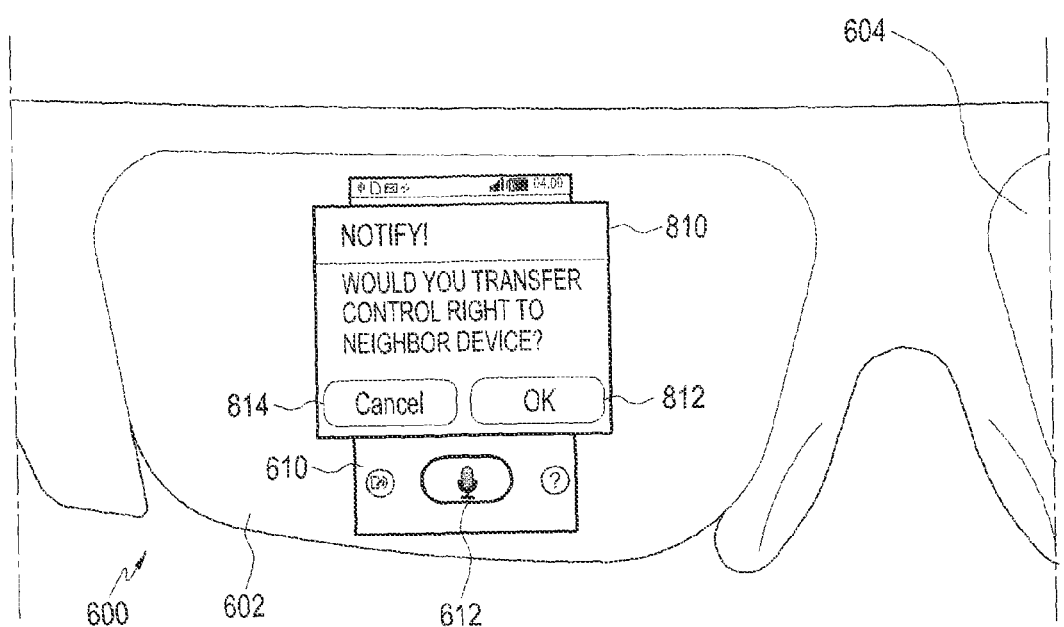
Figure 9:
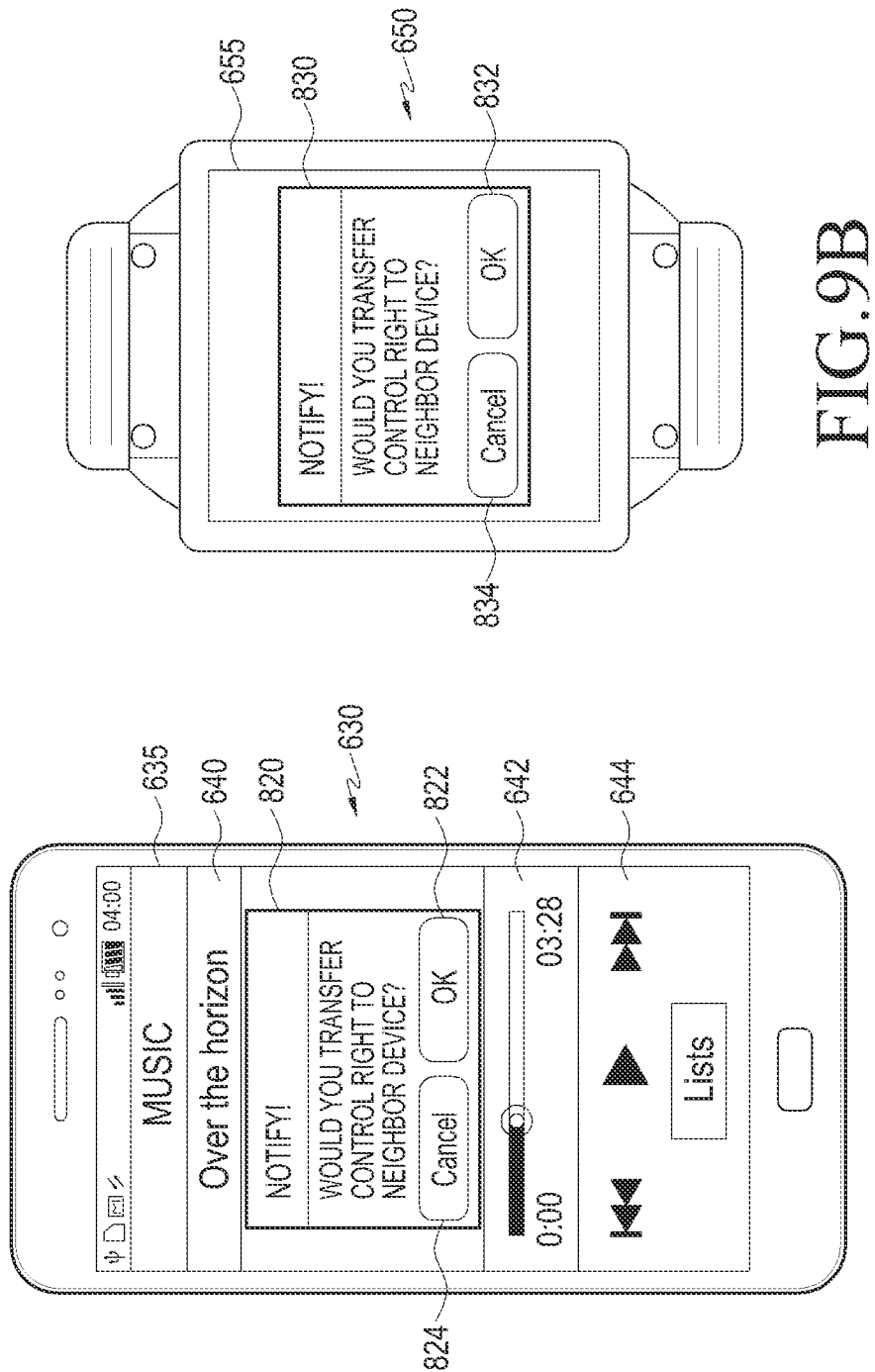

Referring to FIG. 8, the third electronic device 600 may display a notification message 810 for a first notification, through the first glass 602, for the user, under the control of the first electronic device. According to various embodiments, the first electronic device may transmit the notification message 810 to the third electronic device 600, and the third electronic device 600 may display the received notification message 810. The notification message 810 may be displayed to overlap the application screen 610 on which the service has stopped.

The notification message 810 may include guidance words, such as "Would you transfer control right to neighbor device?", "Would you continue to use the service?", or "Would you continue to maintain the connection?", and include an OK button 812 for confirming a transfer of a control right and a Cancel button 814 for cancelling a transfer of a control right. If the user selects any one of the buttons 812 and 814, the third electronic device 600 may transmit button selection information to the first and/or second electronic device. The first electronic device that receives the button selection information may transfer the button selection information to the second electronic device.

According to an embodiment, after receiving the button selection information, the first electronic device may transmit the first information to the second electronic device. According to various embodiments, if the first electronic device receives selection information corresponding to the Cancel button 814, the first electronic device may not transfer the control right and/or the first information.

Referring to FIG. 9A, the first electronic device 630 may display a notification message 820 for a first notification, through a display 635, for the user. The notification message 820 may be displayed on the application screen on which the service has stopped.

The notification message 820 may include guidance words "Would you transfer control right to neighbor device?", and include an OK button 822 for confirming a transfer of a control right and a Cancel button 824 for cancelling a transfer of a control right. If the user selects any one of the buttons 822 and 824, the first electronic device 830 may transmit button selection information to the second electronic device.

According to an embodiment, after receiving the button selection information, the first electronic device 630 may transmit first information for transferring the control right to the second electronic device. According to various embodiments, if the first electronic device 630 receives selection information corresponding to the Cancel button 824, the first electronic device 630 may not transfer the control right and/or the first information.

Referring to FIG. 9B, the second electronic device 650 may display a notification message 830 for a first notification, through the display 655, for the user. The notification message 830 may include guidance words "Would you transfer control right to neighbor device?", and include an OK button 832 for confirming a transfer of a control right, and a Cancel button 834 for cancelling a transfer of a control right. If the user selects any one of the buttons 832 and 834, the second electronic device 650 may transmit button selection information to the first electronic device. The first or second electronic device that receives selection information corresponding to the Cancel button 834 may cancel the transfer of the control right.

Although not shown in the drawings, the fourth electronic device may be a headset including a speaker and a microphone, and output guidance voice for a first notification, through the speaker, for the user, under the control of the first electronic device.

If the user inputs selection information, such as "Cancel", "Confirm", or "OK", through voice, the fourth electronic device may transmit the selection information to the first electronic device.

Referring again to FIG. 5, in operation 540, the first electronic device 501 may terminate the first communication connection to the third electronic device 503 and/or stop providing the first service to the third electronic device 503. Also, the first electronic device 501 may terminate the second communication connection to the fourth electronic device 504 and/or stop providing the second service to the fourth electronic device 504. According to an embodiment, the first and/or second communication connection may be automatically terminated without the control of the first electronic device 501, when a distance between the first electronic device 501 and the third or fourth electronic device 503 or 504 increases. The first electronic device 501 may transmit communication disconnection information and/or service disruption information with respect to the neighbor devices to the second electronic device 502, and then, the second electronic device 502 may establish communication connections to the neighbor devices and/or provide the services to the neighbor devices, respectively, in response to reception of the communication disconnection information and/or the service disruption information.

In operation 545, the second electronic device 502 may establish a first communication connection (for example, pairing or host/client connection) to the third electronic device 503 to resume the paused/stopped first service through the connected third electronic device 503. The second electronic device 502 may connect to the third electronic device 503 through Out Of Band (OOB) pairing. The OOB pairing is a communication connection method of using a channel that is different from a communication channel between the first and third electronic devices 501 and 503. The second electronic device 502 may terminate the communication connection to the first electronic device 501.

In operation 550, the second electronic device 502 may establish a second communication connection (for example, pairing or host/client connection) to the fourth electronic device 504 to resume the paused/stopped second service through the connected fourth electronic device 504. The second electronic device 502 may connect to the fourth electronic device 504 through OOB pairing. The OOB pairing is a communication connection method of using a channel that is different from a communication channel between the first and fourth electronic devices 501 and 504.

Figure 10:
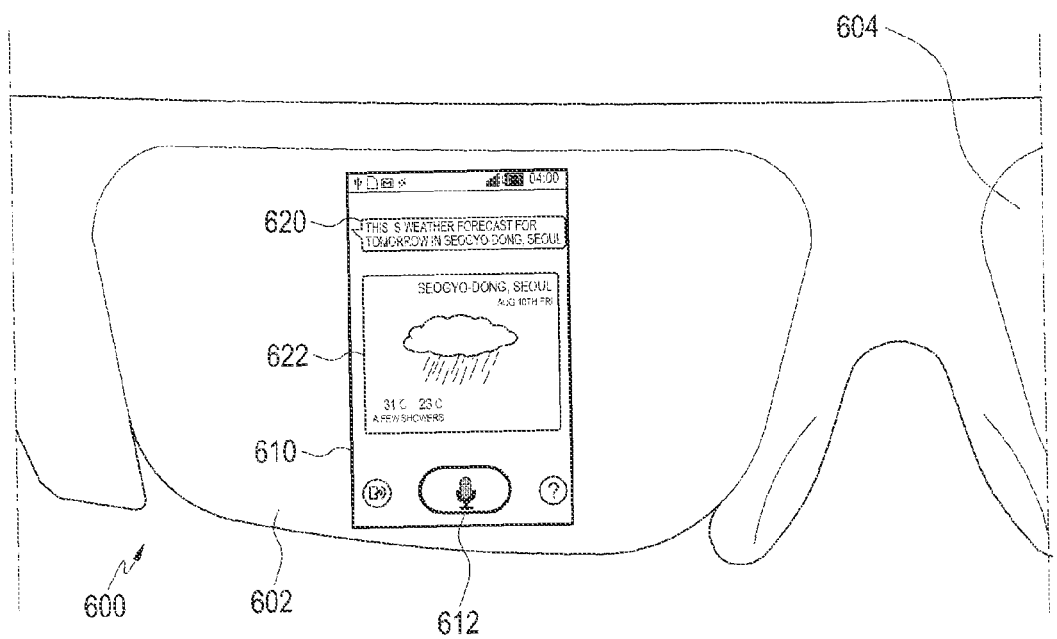

Referring to FIG. 10, the third electronic device 600 may transfer voice information "Seoul weather" input by the user to the first server (for example, a voice recognition server) through the second electronic device and the network. Also, the third electronic device 600 may convert the voice information "Seoul weather" into text information, and then transmit the text information to the first server through the second electronic device and the network. After receiving the voice information, the first server may transmit the results of the search corresponding to the voice information, that is, response information of the first server, in the form of voice information and/or text information to the second electronic device. The second electronic device may transmit the response information of the first server to the third electronic device 600, and the third electronic device 600 may provide the response information of the first server to the user. According to an embodiment, if the results of the search are in the form of voice information, the second electronic device may convert the results of the search into text information, and then transmit the text information to the third electronic device 600.

The response information may include information about Seoul weather searched by the first server, and the third electronic device 600 may display the results of the search, that is, guidance words 620 and weather information 622 on the application screen 610. The first server may search for Seoul weather, based on the voice information received from the second electronic device and a current location (according to various embodiments, Seogyo-dong) of the first or second electronic device received from the second electronic device.

Figures 11A, 11B:
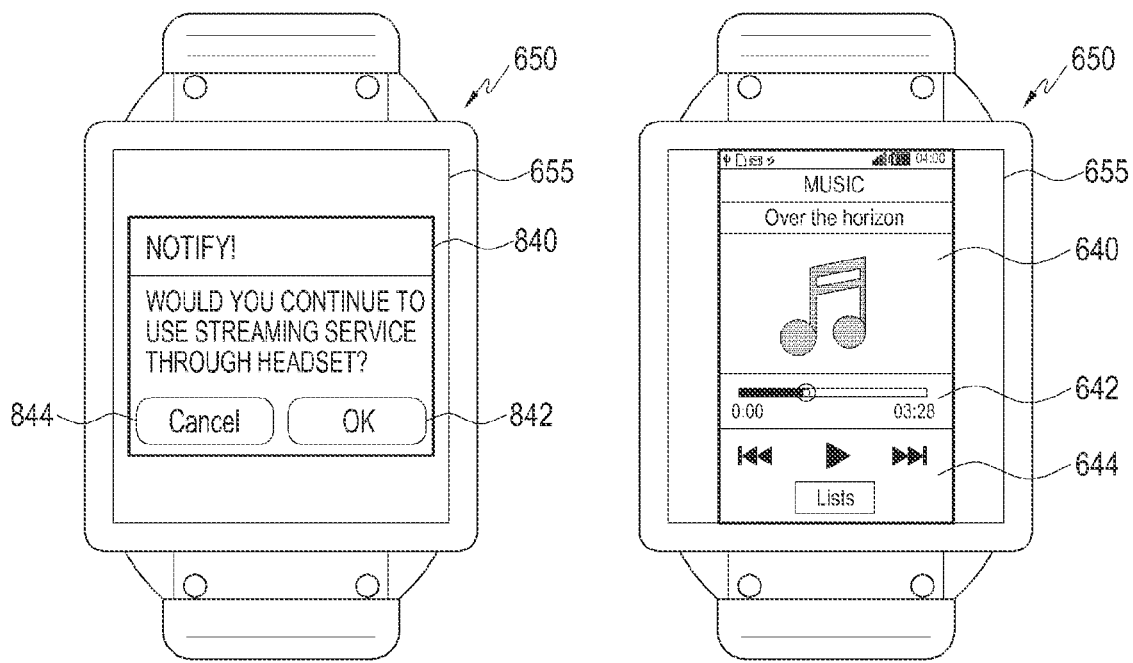

Referring to FIG. 11A, the second electronic device 650 may display a notification message 840 for resuming the stopped service, through the display 655, for the user. The notification message 840 may display guidance words "Would you continue to use streaming service through headset?", and include an OK button 842 for confirming service resumption, and a Cancel button 844 for cancelling service resumption. If the user selects the Cancel button 844, the second electronic device 650 may stop providing the streaming service through the fourth electronic device.

Referring to FIG. 11B, if the user selects the OK button 842, the second electronic device 650 may receive an audio stream corresponding to a remaining portion of a music file after a portion of the music file has been played, from the second server, and transmit the received audio stream to the fourth electronic device. Then, the fourth electronic device may output the audio stream. The second electronic device 650 may display the application screen 640 for the user. The application screen 640 may display the play time information 642, and the menu items 644 including the play/pause button, the next track button, the previous track button, and a Lists button to display a list of selectable music.

Figure 12:
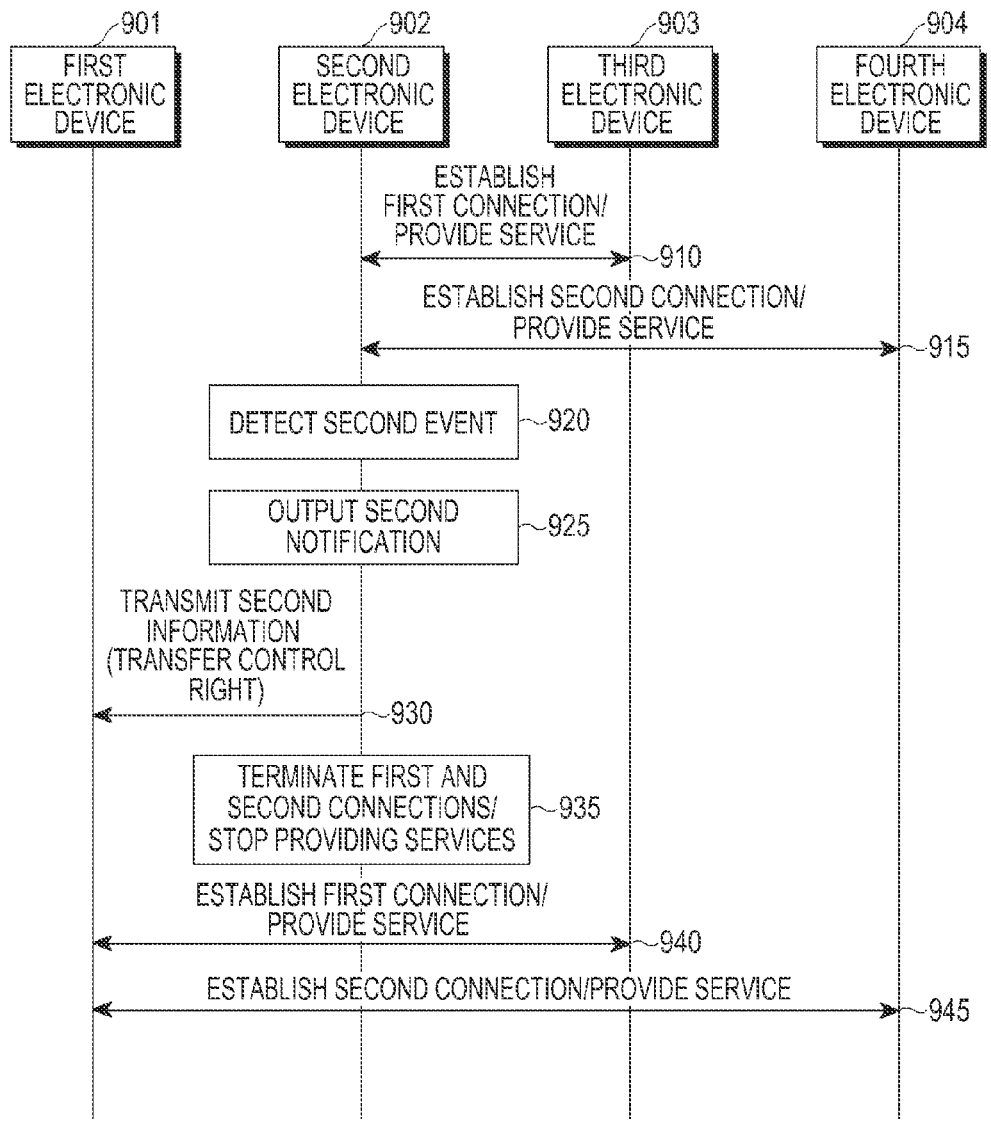
FIG. 12 is a flowchart illustrating a method of communicating with neighbor devices according to various embodiments of the present disclosure.

FIG. 12 is a flowchart illustrating a method of communicating with neighbor devices according to various embodiments of the present disclosure. The method of communicating with neighbor devices may include operations 910 to 945.

In operation 910, a second electronic device 902 may establish a first communication connection (for example, pairing or a host/client connection) to a third electronic device 903.

In operation 915, the second electronic device 902 may establish a second communication connection (for example, pairing or a host/client connection) to a fourth electronic device 904.

In operation 920, the second electronic device 902 may detect a second event needing a transfer/return of a control right or a change of a host. The second event may occur according to an input from a user, a request from a neighbor device, or a distance between the second electronic device 902 and a first electronic device 901. After detecting an event needing a transfer/return of a control right or a change of a host, the second electronic device 902 may transmit a request for changing an owner of a control right or a host, to the first electronic device 901.

In operation 925, the second electronic device 902 may output a second notification for informing a user that a control right has been transferred or returned. The second notification may be provided by generating a sound, generating a vibration, or displaying a message. Also, the second notification may be output through at least one of the first to fourth electronic devices 901 to 904.

In operation 930, after detecting the second event, the second electronic device 902 may transmit second information for returning the control right, to the first electronic device 901. According to various embodiments, the second information may include an indicator (for example, a field value of a predetermined field of a data frame is set to 1) representing the return of the control right, or may further include control right information for neighbor devices, information about content of a service, and/or connection information for neighbor devices. According to various embodiments, the control right information for the neighbor devices, the connection information for the neighbor devices, and/or the information about the content of the service may have been transmitted through periodic/non-periodic synchronization between the first electronic device 901 and the second electronic device 902, before the second event is detected. Such a synchronization request may be performed by the first electronic device 901 or the second electronic device 902.

In operation 935, the second electronic device 902 may terminate the first communication connection to the third electronic device 903 and/or stop providing the first service to the third electronic device 903. Also, the second electronic device 902 may terminate the second communication connection to the fourth electronic device 904 and/or stop providing the second service to the fourth electronic device 904. According to an embodiment, the first and/or second communication connection may be automatically terminated without the control of the second electronic device 902. The second electronic device 902 may re-establish a communication connection to the first electronic device 901. The second electronic device 902 may function as a client of the first electronic device 901 that is a host. The second electronic device 902 may transmit communication disconnection information and/or service disruption information with respect to neighbor devices to the first electronic device 901. After receiving the communication disconnection information and/or the service disruption information, the first electronic device 901 may establish communication connections to the neighbor devices and/or provide services to the neighbor devices.

According to an embodiment, if the second electronic device 902 is outputting a certain service (for example, a streaming service or a call service), the second electronic device 902 may delay operation of terminating the communication connections to the neighbor devices, stopping providing the services to the neighbor devices, and/or returning the control right, until the service is completely output.

In operation 940, the first electronic device 901 may establish a first communication connection (for example, pairing or a host/client connection) to the third electronic device 903 to resume the paused/stopped first service through the connected third electronic device 903.

In operation 945, the first electronic device 901 may establish a second communication connection (for example, pairing or a host/client connection) to the fourth electronic device 904 to resume the paused/stopped second service through the connected fourth electronic device 904.

Figure 13:
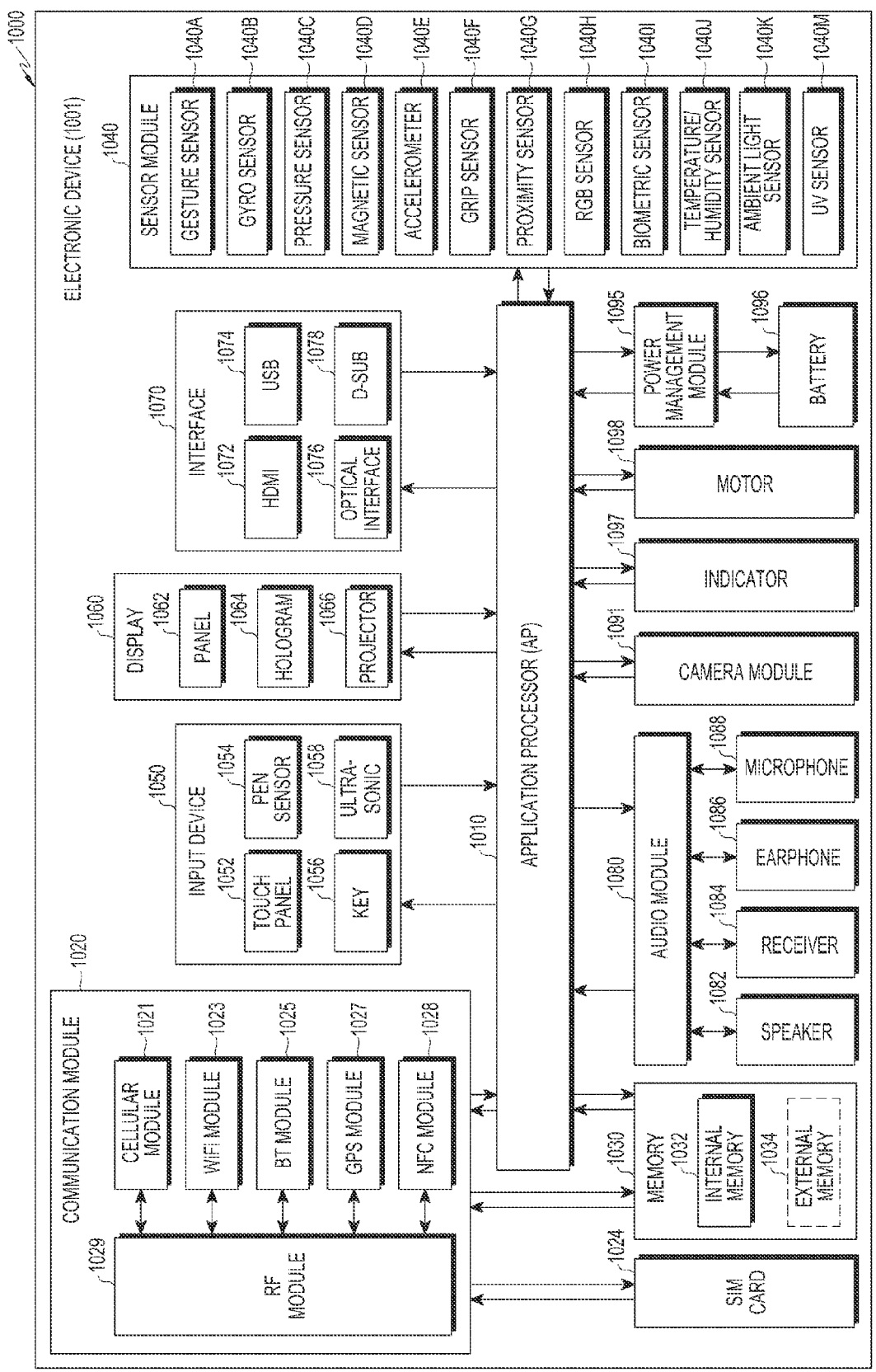
FIG. 13 is a block diagram illustrating an electronic device according to various embodiments of the present disclosure.

FIG. 13 is a block diagram of an electronic device 1001 according to various embodiments of the present disclosure.

The electronic device 1001 may be configured to be the entire or a part of the electronic device 101 shown in FIG. 1. Referring to the block diagram 1000 in FIG. 13, the electronic device 1001 may include at least one Application Processor (AP) 1010, a communication module 1020, a Subscriber Identification Module (SIM) card 1024, a memory 1030, a sensor module 1040, an input device 1050, a display 1060, an interface 1070, an audio module 1080, a camera module 1091, a power management module 1095, a battery 1096, an indicator 1097, and a motor 1098. The AP 1010 may drive Operating System (OS) or an application program to control a plurality of hardware or software components connected to the AP 1010, and perform processing and operations of various data including multimedia data. The AP 1010 may be implemented as System on Chip (SoC). According to an embodiment, the AP 1010 may further include a Graphic Processing Unit (GPU) (not shown).

The communication module 1020 (for example, the communication interface 160 of FIG. 1) may perform data transmission/reception for communication between the electronic device 1001 (for example, the electronic device 101) and other electronic devices (for example, the electronic device 104 or the server 106 of FIG. 1) connected to the electronic device 1001 through a network. According to an embodiment, the communication module 1020 may include a cellular module 1021, a WiFi module 1023, a BT module 1025, a GPS module 1027, a NFC module 1028, and a Radio Frequency (RF) module 1029.

The cellular module 1021 may provide a voice call, a video call, a message service, or an interne service through a communication network (for example, LTE, LTE-A, CDMA, WCDMA, UMTS, WiBro, or GSM). Also, the cellular module 1021 may identify and authenticate the electronic device 1001 in a communication network, using a subscriber identification module (for example, the SIM card 1024). According to an embodiment, the cellular module 1021 may perform at least one part of functions that can be provided by the AP 1010. For example, the cellular module 1021 may perform at least one part of a multimedia control function.

According to an embodiment, the cellular module 1021 may include a Communication Processor (CP). Also, the cellular module 1021 may be implemented as SoC. In FIG. 13, components, such as the cellular module 1021 (for example, CP), the memory 1030, or the power management module 1095, are shown as separate components, however, according to an embodiment, the AP 1010 may be implemented to include at least one part (for example, the cellular module 1021) of the aforementioned components.

According to an embodiment, the AP 1010 or the cellular module 1021 (for example, CP) may load a command or data received from at least one of a non-volatile memory or another component connected to the AP 1010 or the cellular module 1021 (for example, CP), in a volatile memory, and then process the command or data. Also, the AP 1010 or the cellular module 1021 may store data received from or created by at least one of other components, in a non-volatile memory.

The WiFi module 1023, the BT module 1025, the GPS module 1027, or the NFC module 1028 may include a processor to process data that is received or transmitted through the corresponding module. In FIG. 13, the cellular module 1021, the WiFi module 1023, the BT module 1025, the GPS module 1027, and the NFC module 1028 are shown as separated blocks, however, according to an embodiment, at least one part (for example, two or more) of the cellular module 1021, the WiFi module 1023, the BT module 1025, the GPS module 1027, and the NFC module 1028 may be included in a single Integrated Chip (IC) or a single IC package. For example, at least one part (for example, a communication processor corresponding to the cellular module 1021 and a WiFi processor corresponding to the WiFi module 1023) of processors corresponding to the cellular module 1021, the WiFi module 1023, the BT module 1025, the GPS module 1027, and the NFC module 1028 may be implemented as single SoC.

The RF module 1029 may perform data transmission/reception, for example, transmission/reception of RF signals. The RF module 1029 may include, as not shown in FIG. 13, a transceiver, a Power Amp Module (PAM), a frequency filter, or a Low Noise Amplifier (LNA). Also, the RF module 1029 may further include an element (for example, a conductor or a conducting wire) for transmitting/receiving electronic waves in free air space for wireless communication. In FIG. 13, the cellular module 1021, the WiFi module 1023, the BT module 1025, the GPS module 1027, are the NFC module 1028 are shown to share the RF module 1029, however, according to an embodiment, at least one of the cellular module 1021, the WiFi module 1023, the BT module 1025, the GPS module 1027, and the NFC module 1028 may perform transmission/reception of RF signals through a separate RF module.

The SIM card 1024 may be a card including a subscriber identification module, and may be inserted into a slot formed at a specific location of the electronic device. The SIM card 1024 may include unique identification information (for example, Integrated Circuit Card Identifier (ICCID)) or subscriber information (for example, International Mobile Subscriber Identity (IMSI)).

The memory 1030 (for example, the memory 130) may include at least one of an internal memory 1032 and an external memory 1034. The internal memory 1032 may include at least one of a volatile memory (for example, Dynamic RAM (DRAM), Static RAM (SRAM), Synchronous Dynamic RAM (SDRAM), or the like), or a non-volatile memory (for example, One Time Programmable ROM (OTPROM), Programmable ROM (PROM), Erasable and Programmable ROM (EPROM), Electrically Erasable and Programmable ROM (EEPROM), mask ROM, flash ROM, NAND flash memory, NOR flash memory, or the like).

According to an embodiment, the internal memory 1032 may be a Solid State Drive (SSD). The external memory 1034 may further include a flash drive, for example, Compact Flash (CF), Secure Digital (SD), Micro Secure Digital (Micro-SD), Mini Secure Digital (Mini-SD), extreme Digital (xD), or Memory Stick. The external memory 1034 may be functionally connected to the electronic device 1001 through various interfaces. According to an embodiment, the electronic device 1001 may further include a storage device (or storage medium) such as a hard drive.

The sensor module 1040 may measure physical quantity, sense an operation state of the electronic device 1001, and convert the measured or sensed information into electrical signals. The sensor module 1040 may include at least one of a gesture sensor 1040A, a gyro sensor 1040B, a pressure sensor 1040C, a magnetic sensor 1040D, an accelerometer 1040E, a grip sensor 1040F, a proximity sensor 1040G, a color sensor 1040H (for example, a Red, Green, Blue (RGB) sensor), a biometric sensor 1040I, a temperature/humidity sensor 1040J, an ambient light sensor 1040K, or an Ultra Violet (UV) sensor 1040M. Additionally or alternatively, the sensor module 1040 may include an E-nose sensor (not shown), an ElectroMyoGraphy (EMG) sensor (not shown), an ElectroEncephaloGram (EEG) sensor (not shown), an ElectroCardioGram (ECG) sensor (not shown), an Infrared (IR) sensor (not shown), an iris sensor (not shown), or a fingerprint sensor (not shown). The sensor module 1040 may further include a control circuit to control at least one sensor included therein.

The input device 1050 may include a touch panel 1052, a (digital) pen sensor 1054, a key 1056, or an ultrasonic input device 1058. The touch panel 1052 may be a capacitive type, a resistive type, an infrared type, or an ultrasonic type. Also, the touch panel 1052 may further include a control circuit. If the touch panel 1052 is a capacitive type, the touch panel 1052 can recognize proximity as well as a direct touch input. The touch panel 1052 may further include a tactile layer. In this case, the touch panel 752 may give a user tactile impression.

The (digital) pen sensor 1054 may sense a pen touch input using a method that is the same as or similar to a method of receiving a touch input from a user. Also, the pen sensor 1054 may sense a pen touch input using a recognition sheet. The key 1056 may be a physical button, an optical key, or a keypad. The ultrasonic input device 1058 may be a device capable of detecting data by sensing sound waves with a microphone (for example, a microphone 1088) in the electronic device 1001, through an input tool of generating ultrasonic signals. The ultrasonic input device 1058 may enable RF IDentification (RFID). According to an embodiment, the electronic device 1001 may receive a user input from an external device (for example, a computer or a server) connected to the electronic device 1001, using the communication module 1020.

The display 1060 (for example, the display 150 of FIG. 1) may include a panel 1062, a hologram 1064, or a projector 1066. The panel 1062 may be a Liquid-Crystal Display (LCD) or an Active-Matrix Organic Light-Emitting Diode (AM-OLED). The panel 1062 may be implemented to be flexible, transparent, or wearable. The panel 1062 may be integrated into the touch panel 1052. The hologram 1064 may show a 3 Dimensional (3D) image in the air using interference of light. The projector 1066 may project light onto a screen to display an image. The screen may be located inside or outside the electronic device 1001. According to an embodiment, the display 1060 may further include a control circuit for controlling the panel 1062, the hologram 1064, or the projector 1066.

The interface 1070 may include, for example, High-Definition Multimedia Interface (HDMI) 1072, a Universal Serial Bus (USB) 1074, an optical interface 1076, or a D-subminiature (D-sub) 1078. The interface 1070 may be, for example, included in the communication interface 160 shown in FIG. 1. Additionally or alternatively, the interface 1070 may include, for example, a Mobile High-definition Link (MHL) interface, a SD/Multi-Media Card (MMC) interface, or an Infrared Data Association (IrDA) interface.

The audio module 1080 may convert sound into electronic signals and vice versa. At least one component of the audio module 1080 may be, for example, included in the input/output interface 140 shown in FIG. 1. The audio module 1080 may process voice information input/output through, for example, a speaker 1082, a receiver 1084, earphones 1086, or the microphone 1088.

The camera module 1091, which captures still images or moving images, may include one or more images sensors (for example, a front sensor or a rear sensor), lenses (not shown), an Image Signal Processor (ISP) (not shown), or a flash (for example, LED or xenon lamp) (not shown).

The power management module 1095 may manage power of the electronic device 1001. As not shown in FIG. 13, the power management module 1095 may include a Power Management Integrated Circuit (PMIC), a charge Integrated Circuit (IC), or a battery or fuel gauge.

The PMIC may be installed in an integrated circuit or a SoC semiconductor. A charging method may be classified into a wired type and a wireless type. The charge IC may charge a battery, and prevent inflow of overvoltage or overcurrent from a charger. According to an embodiment, the charge IC may include a charge IC for at least one of a wired charging method and a wireless charging method. The wireless charging method may be a magnetic resonance method, a magnetic induction method, or an electromagnetic wave method, and in order to perform the wireless charging method, the charge IC may include an additional circuit, for example, a coil loop, a resonance circuit, or a rectifier.

The battery gauge may measure, for example, a level of battery 1096, and a voltage, a current, or a temperature during charging. The battery 1096 may store or generate electricity, and supply power to the electronic device 1001 using the stored or generated electricity. The battery 1096 may be a rechargeable battery or a solar battery.

The indicator 1097 may display a specific state (for example, a booting state, a message state, or battery level) of the electronic device 1001 or a part (for example, the AP 1010) of the electronic device 1001. The motor 1098 may convert electrical signals into mechanical vibration. Although not shown in FIG. 13, the electronic device 1001 may include a processor (for example, GPU) for supporting a mobile TV. The processor may process media data based on a standard of Digital Multimedia Broadcasting (DMB), Digital Video Broadcasting (DVB), media flow, or the like.

Each of the above-described units of the electronic device 1001 according to various embodiments of the present disclosure may be configured with one or more components, and the units may be termed according to a kind of the corresponding electronic device. The electronic device 1001 may include at least one of the above-described components. Also, the electronic device 1001 may omit some of the above-described components or further include another component(s). Furthermore, some of the components of the electronic device 1001 may be combined to constitute an entity which performs the same functions as the corresponding components.

The term "module" used in the present disclosure may means a unit including, for example, hardware, software, firmware, or a combination thereof. The "module" may be interchangeably used with another term, such as "unit", "logic", "logical block", "component", or "circuit". The "module" may be a minimum unit or a part of components integrated into one body. Also, the "module" may be a minimum unit or a part for performing one or more functions. The "module" may be implemented mechanically or electronically. For example, the "module" may include at least one of an Application-Specific Integrated Circuit (ASIC) chip, Field-Programmable Gate Arrays (FPGAs), or a programmable-logic device, which performs certain operations, already developed or to be developed in future.

According to various embodiments, at least one part of an apparatus (for example, modules or their functions) or method (for example, operations) according to various embodiments of the present disclosure may be implemented as an instruction stored in non-transitory computer-readable storage media, for example, in the form of a programming module. When the instruction is executed by one or more processors (for example, the processor 120), the one or more processors may perform a function corresponding to the instruction. The non-transitory computer-readable storage media may be, for example, the memory 130. At least one part of the programming module may be implemented (for example, executed) by the processor 120. At least one of the programming module may include a module, a program, a routine, sets of instructions, or a processor for performing one or more functions.

The non-transitory computer-readable storage media may include magnetic media (for example, a hard disk, a floppy disk, and a magnetic tape), optical media (for example, Compact Disc Read Only Memory (CD-ROM) and DVD), magneto-optical media (for example, floptical disk), and hardware device (for example, Read Only Memory (ROM), and Random Access Memory (RAM), and flash memory) specifically configured to store and perform a program instruction (for example, a programming module). Also, the programming instruction may include a high-level language code that can be executed by a computer using an interpreter, as well as a machine code that is created by a compiler. The hardware device may be configured to operate as at least one software module for performing operations according to various embodiments of the present disclosure, and vice versa.

The module or the programming module according to various embodiments of the present disclosure may include at least one of the aforementioned components, omit a part of the aforementioned components, or further include another component. The module, the programming module, or operations that are performed by another component may be executed sequentially, in parallel, repeatedly, or heuristically. Also, a part of the operations may be executed in a different order, may be omitted, or may add another operation.

According to various embodiments of the present disclosure, in non-transitory storage medium that stores commands, the commands may be set to enable at least one processor to perform at least one operation when the commands are executed by the at least one processor, wherein the at least one operation includes operations of connecting to a first electronic device, receiving first information for a third electronic device from the first electronic device, and controlling the third electronic device using the first information, wherein the first information may include control right information for the third electronic device.

Therefore, according to various embodiments of the present disclosure, it is possible to easily select and control the same neighbor device from among a plurality of electronic devices by transferring a control right.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method in which a second electronic device communicates with a neighbor device, the method comprising:
  wirelessly and directly connecting the second electronic device to a first electronic device;
  receiving, by the second electronic device, first information for a third electronic device from the first electronic device; and
  controlling, by the second electronic device, the third electronic device using the first information,
  wherein the first information includes control right information for the third electronic device, and
  wherein the first, second, and third electronic devices wirelessly and directly communicate with each other.

2. The method of claim 1, wherein the controlling of the third electronic device comprises connecting to the third electronic device using the first information.

3. The method of claim 1, further comprising:
  transmitting second information for the third electronic device to the first electronic device; and
  disconnecting from the third electronic device, wherein the second information includes control right information for the third electronic device.

4. The method of claim 1, wherein the controlling of the third electronic device comprises transmitting content of a service to the third electronic device using the first information.

5. A non-transitory machine-readable storage medium storing a program to execute a method in which a second electronic device communicates with a neighbor device, the method comprising:
- wirelessly and directly connecting the second electronic device to a first electronic device;
- receiving, by the second electronic device, first information for a third electronic device from the first electronic device; and
- controlling, by the second electronic device, the third electronic device using the first information,
- wherein the first information includes control right information for the third electronic device, and
- wherein the first, second, and third electronic devices wirelessly and directly communicate with each other.

6. A second electronic device for communicating with a neighbor device, the second electronic device comprising:
- a communication module; and
- a processor configured to:
  - wirelessly and directly connect the second electronic device to a first electronic device through the communication module,
  - receive first information for a third electronic device from the first electronic device through the communication module, and
  - control the third electronic device using the first information,
- wherein the first information includes control right information for the third electronic device, and
- wherein the first, second, and third electronic devices wirelessly and directly communicate with each other.

7. A method in which a first electronic device communicates with a neighbor device, the method comprising:
- wirelessly and directly connecting the first electronic device to a second electronic device;
- transmitting, by the first electronic device, first information for a third electronic device to the second electronic device; and
- disconnecting the first electronic device from the third electronic device,
- wherein the first information includes control right information for the third electronic device, and
- wherein the first, second, and third electronic devices wirelessly and directly communicate with each other.

8. The method of claim 7, further comprising:
- receiving second information for the third electronic device from the second electronic device; and
- controlling the third electronic device using the second information,
- wherein the second information includes control right information for the third electronic device.

9. A non-transitory machine-readable storage medium storing a program to execute a method in which a first electronic device communicates with a neighbor device, the method comprising:
- wirelessly and directly connecting the first electronic device to a second electronic device;
- transmitting, by the first electronic device, first information for a third electronic device to the second electronic device; and
- disconnecting the first electronic device from the third electronic device,
- wherein the first information includes control right information for the third electronic device, and
- wherein the first, second, and third electronic devices wirelessly and directly communicate with each other.

10. A first electronic device for communicating with a neighbor device, the first electronic device comprising:
- a communication module; and
- a processor configured to:
  - wirelessly and directly connect the first electronic device to a second electronic device through the communication module,
  - transmit first information for a third electronic device to the second electronic device, and
  - disconnect from the third electronic device,
- wherein the first information includes control right information for the third electronic device, and
- wherein the first, second, and third electronic devices wirelessly and directly communicate with each other.

11. The non-transitory machine-readable storage medium of claim 5, wherein the controlling of the third electronic device comprises connecting to the third electronic device using the first information.

12. The non-transitory machine-readable storage medium of claim 5, further comprising:
- transmitting second information for the third electronic device to the first electronic device; and
- disconnecting from the third electronic device,
- wherein the second information includes control right information for the third electronic device.

13. The non-transitory machine-readable storage medium of claim 5, wherein the controlling of the third electronic device comprises transmitting content of a service to the third electronic device using the first information.

14. The second electronic device of claim 6, wherein the controlling of the third electronic device comprises connecting to the third electronic device using the first information.

15. The second electronic device of claim 6, further comprising:
- transmitting second information for the third electronic device to the first electronic device; and
- disconnecting from the third electronic device,
- wherein the second information includes control right information for the third electronic device.

16. The second electronic device of claim 6, wherein the controlling of the third electronic device comprises transmitting content of a service to the third electronic device using the first information.

17. The non-transitory machine-readable storage medium of claim 9,
- wherein the first information includes connection information for the third electronic device, and
- wherein the connection information for the third electronic device includes at least one of identification information of the third electronic device and network setting information of the third electronic device.

18. The non-transitory machine-readable storage medium of claim 9, further comprising:
- receiving second information for the third electronic device from the second electronic device; and
- controlling the third electronic device using the second information,
- wherein the second information includes control right information for the third electronic device.

19. The first electronic device of claim 10,
wherein the first information includes connection information for the third electronic device, and
wherein the connection information for the third electronic device includes at least one of identification information of the third electronic device and network setting information of the third electronic device.

20. The first electronic device of claim 10, further comprising:
receiving second information for the third electronic device from the second electronic device; and
controlling the third electronic device using the second information,
wherein the second information includes control right information for the third electronic device.

\* \* \* \* \*